(12) United States Patent
Higuchi

(10) Patent No.: US 7,380,821 B2
(45) Date of Patent: Jun. 3, 2008

(54) PASSENGER PROTECTION APPARATUS

(75) Inventor: Kazuo Higuchi, Mc Lean, VA (US)

(73) Assignee: Takata Corporation, Tokyo (JP)

( * ) Notice: Subject to any disclaimer, the term of this patent is extended or adjusted under 35 U.S.C. 154(b) by 424 days.

(21) Appl. No.: 11/050,908

(22) Filed: Jan. 27, 2005

(65) Prior Publication Data

US 2005/0161921 A1 Jul. 28, 2005

(30) Foreign Application Priority Data

Jan. 27, 2004 (JP) ............................. 2004-018298
Dec. 24, 2004 (JP) ............................. 2004-373908

(51) Int. Cl.
*B60R 21/016* (2006.01)
(52) U.S. Cl. ............................. 280/743.1; 280/728.3; 280/730.1; 280/735; 280/739
(58) Field of Classification Search ............. 280/743.1, 280/730.1, 735, 753, 728.3, 739
See application file for complete search history.

(56) References Cited

U.S. PATENT DOCUMENTS

| | | | |
|---|---|---|---|
| 4,258,931 A | | 3/1981 | Lee et al. |
| 5,344,184 A | * | 9/1994 | Keeler et al. ............. 280/730.1 |
| 5,490,691 A | | 2/1996 | Sinnhuber et al. |
| 5,505,487 A | * | 4/1996 | Brown et al. ............. 280/730.1 |
| 5,695,242 A | * | 12/1997 | Brantman et al. ........ 297/216.1 |
| 5,842,717 A | * | 12/1998 | Wohllebe et al. ........... 280/734 |
| 5,897,135 A | * | 4/1999 | Oehm ...................... 280/728.3 |
| 6,024,377 A | * | 2/2000 | Lane, Jr. ................... 280/728.3 |
| 6,045,151 A | * | 4/2000 | Wu .......................... 280/728.3 |
| 6,086,091 A | * | 7/2000 | Heinz et al. .............. 280/728.3 |
| 6,170,871 B1 | * | 1/2001 | Goestenkors et al. .... 280/743.1 |
| 6,338,501 B1 | | 1/2002 | Heilig et al. |
| 6,357,789 B1 | * | 3/2002 | Harada et al. ............ 280/730.2 |
| 6,428,041 B1 | * | 8/2002 | Wohllebe et al. ........... 280/736 |
| 6,581,959 B2 | * | 6/2003 | Muller ..................... 280/728.3 |
| 6,715,788 B2 | | 4/2004 | Saiguchi et al. |
| 6,733,033 B2 | * | 5/2004 | Muller ..................... 280/728.3 |
| 6,789,819 B1 | * | 9/2004 | Husby ........................ 280/735 |
| 6,793,243 B2 | * | 9/2004 | Husby ........................ 280/735 |
| 6,846,015 B2 | * | 1/2005 | Meduvsky et al. ......... 280/753 |

(Continued)

FOREIGN PATENT DOCUMENTS

DE 10056300 6/2002

(Continued)

*Primary Examiner*—Anne Marie M. Boehler
*Assistant Examiner*—Timothy Wilhelm
(74) *Attorney, Agent, or Firm*—Manabu Kanasaka

(57) ABSTRACT

A passenger protection apparatus is mounted on a vehicle, and includes a detecting device for foreseeing and detecting a collision of the vehicle; a passenger protection device to be situated between a passenger and the vehicle for protecting the passenger upon the collision; a driving device for driving the passenger protection device reversibly in a direction approaching the passenger and a direction away from the passenger; and a control device for controlling the driving device according to the detecting device. The control device controls the driving device to move the passenger protection device prior to the collision from a first position to a second position closer to the passenger than the first position when the detecting device foresees the collision. The control device controls the driving device to move the passenger protection device from the second position to the first position when the collision is avoided.

14 Claims, 18 Drawing Sheets

U.S. PATENT DOCUMENTS

| | | | |
|---|---|---|---|
| 6,959,944 B2 * | 11/2005 | Mori et al. | 280/728.2 |
| 6,971,667 B2 * | 12/2005 | Enders et al. | 280/730.1 |
| 7,048,298 B2 * | 5/2006 | Arwood et al. | 280/730.1 |
| 7,104,566 B2 * | 9/2006 | Pinsenschaum et al. | 280/728.3 |
| 7,234,727 B2 * | 6/2007 | Mori et al. | 280/730.1 |
| 2002/0036398 A1 * | 3/2002 | Wohllebe | 280/735 |
| 2002/0041090 A1 * | 4/2002 | Wohllebe et al. | 280/736 |
| 2002/0089153 A1 * | 7/2002 | Muller | 280/728.3 |
| 2002/0130495 A1 * | 9/2002 | Lotspih et al. | 280/730.2 |
| 2003/0001372 A1 | 1/2003 | Browne et al. | |
| 2003/0122356 A1 * | 7/2003 | Fischer et al. | 280/743.1 |
| 2004/0026905 A1 * | 2/2004 | Kim et al. | 280/730.2 |
| 2005/0121888 A1 * | 6/2005 | Sato et al. | 280/730.2 |
| 2006/0103119 A1 * | 5/2006 | Kurimoto et al. | 280/730.2 |
| 2006/0108777 A1 * | 5/2006 | Mabuchi et al. | 280/730.2 |
| 2006/0131847 A1 * | 6/2006 | Sato et al. | 280/730.2 |

FOREIGN PATENT DOCUMENTS

| | | |
|---|---|---|
| EP | 0 621 159 | 10/1994 |
| JP | 55-147948 | 10/1980 |
| JP | 58-181621 | 12/1983 |
| JP | 10-166989 | 6/1998 |
| JP | 2001-206176 | 7/2001 |
| JP | 2001-328504 | 11/2001 |
| JP | 2006-001383 | 1/2006 |

* cited by examiner

Fig. 5
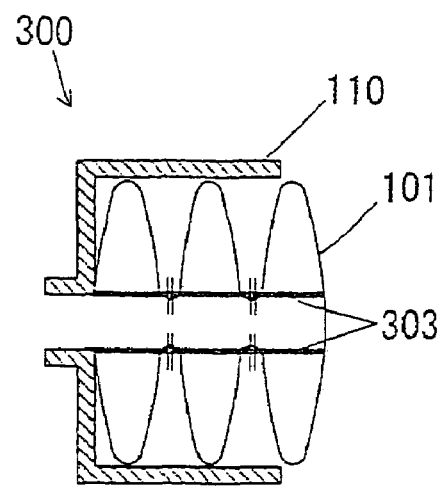
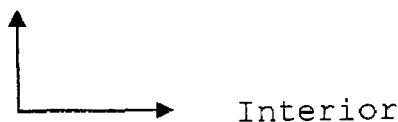
Fig. 6
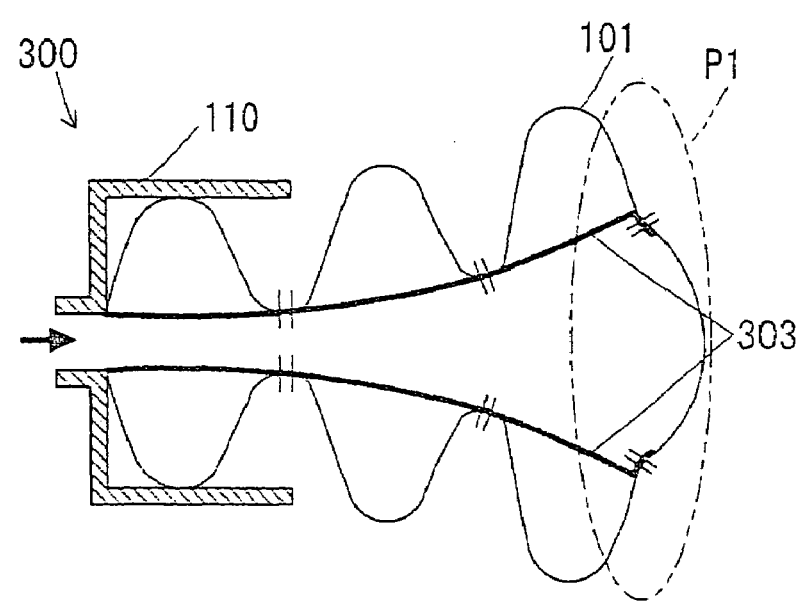
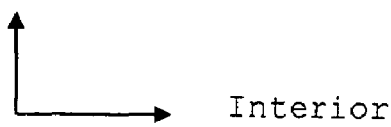

Fig. 11
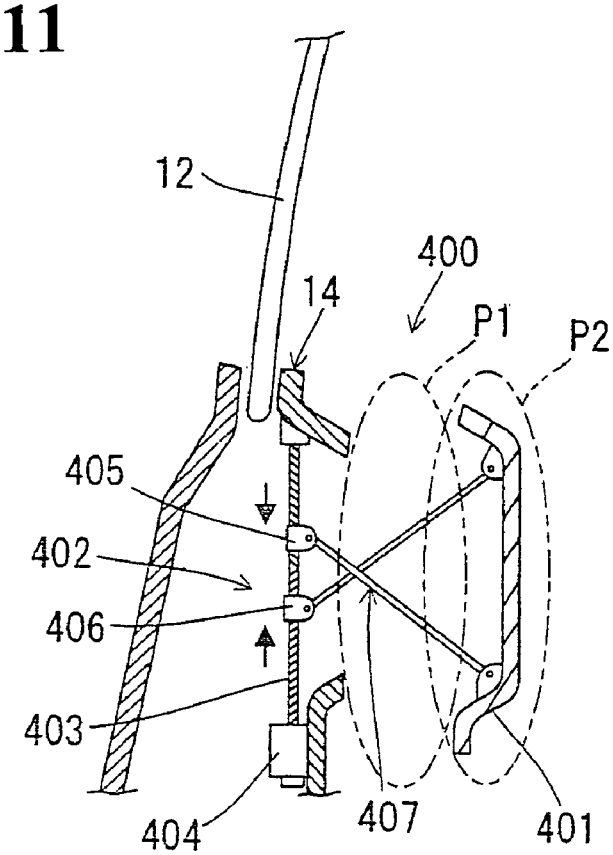
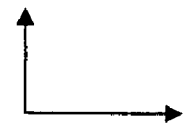

Upper

Interior

PASSENGER PROTECTION APPARATUS

BACKGROUND OF THE INVENTION AND RELATED ART STATEMENT

The present invention relates to a passenger protection apparatus provided in an automobile or the like. More particularly, the present invention relates to a passenger protection apparatus having a structure in which a passenger protection device is deployed in a passenger protection region before a vehicle collision for protecting a passenger upon a vehicle collision.

Conventionally, various passenger protection apparatuses have been proposed for protecting a passenger from colliding with a sidewall of a vehicle such as a side window or a door in case of a vehicle accident such as a collision on a side of the vehicle. For example, Japanese Patent Publication (Kokai) No. 2001-328504 has disclosed a passenger protection apparatus having an air bag provided along a side roof rail of an automobile. In the passenger protection apparatus, an air bag is deployed and expanded in a region between a passenger and a vehicle sidewall for protecting the passenger upon a vehicle accident. In order to protect the passenger more quickly with a high technical level, it is necessary to provide further advanced technology.

In view of the problems described above, the present invention has been made, and an object of the present invention is to provide a passenger protection apparatus for protecting a passenger upon a vehicle accident with an improved technology.

Further objects and advantages of the invention will be apparent from the following description of the invention.

SUMMARY OF THE INVENTION

To attain the objects mentioned above, according to the present invention, a passenger protection apparatus is provided in a vehicle such as an automobile, a train or a ship. According to a first aspect of the present invention, a passenger protection apparatus provided in a vehicle includes at least a detecting device, a passenger protection device, a driving device, and a control device. The passenger protection apparatus is mounted at a location such as a side door trim, a side roof rail, a pillar, a seat (specifically, a side portion of a seat such as a portion facing a vehicle sidewall or a front portion of a seat cushion), a steering wheel, or a dashboard.

The detecting device has a function of detecting information regarding a vehicle collision. Information detected by the detecting device includes information for foreseeing (determining) whether the vehicle collides with other vehicles, an obstacle or other objects, i.e., a distance to an object of collision and a relative speed. The detecting device includes a radar such as a milli-wave radar or laser radar, in which electromagnetic waves (milli-waves or laser beam) with a wavelength of few millimeters are emitted toward the object, and waves reflected from the object are measured, so that a distance to the object, a relative speed and the like are determined (measured).

The passenger protection device has a function of deploying between the passenger and the vehicle for protecting the passenger upon a vehicular accident such as a collision or roll-over. The passenger protection device includes an air bag and a protecting pad member with sufficient elasticity for absorbing an impact force acting on the passenger upon a vehicular accident. The passenger protection device is installed at a portion of the vehicle corresponding to a part of the passenger to be protected. The part of the passenger to be protected by the passenger protection device includes a head, neck, shoulder, chest, abdomen, knee, and lower limb. The passenger protection device includes a passenger protection device for protecting a passenger moving toward a side of the vehicle upon a vehicle accident, and a passenger protection device for preventing a so-called submarine phenomenon upon a vehicle accident, in which the passenger moves and slides toward a front portion of the seat or through a seat belt downwardly.

The driving device has a function of reversibly driving the passenger protection device in a direction approaching the passenger or a direction away from the passenger. In other words, the driving device allows the passenger protection device to move in a direction approaching the passenger or a direction away from the passenger.

The driving device may drive the passenger protection device in a direction extending linearly, or to be curved or bent. More specifically, the passenger protection device may be mounted on a sidewall of the vehicle, and move from a side of the passenger in the horizontal direction, thereby approaching or moving away from the passenger. Alternatively, the passenger protection device may be mounted above a sidewall of the vehicle. In this case, after moving downwardly, the passenger protection device moves in the horizontal direction to approach the passenger, and then in the reverse direction away from the passenger.

The control device has a function of controlling the driving device based on the information detected by the detecting device. More particularly, the control device controls the driving device to move the passenger protection device from a first position to a second position toward the passenger when the detecting device foresees a vehicle collision. When it is determined that a vehicle collision is avoided, the control device controls the driving device to move the passenger protection device from the second position to the first position. The first position is typically an initial position at which the passenger protection device is retained. The second position corresponds to the passenger protection region in which the passenger is protected upon a vehicle accident, or a position away from the passenger protection region toward a vehicle member. The first and second positions are not necessarily fixed points, and may be a region having a certain range in the moving direction of the passenger protection device.

In the passenger protection apparatus of the first aspect, when a vehicle collision is foreseen, the passenger protection device is moved in advance from the first position such as a housing position to the second position for protecting the passenger upon a possible collision. It is possible to rapidly protect the passenger upon an accident since the passenger protection device moves in the direction approaching the passenger in advance. The passenger protection device with such a structure is effective for rapidly protecting the passenger as compared with a passenger protection device with a structure operating upon an accident.

The passenger protection device may have a structure in which the passenger is protected at the second position, or may have a structure in which the passenger protection device is moved from the second position to a third position further closer to the passenger to protect the passenger at the third position. When a vehicle accident is foreseen and the accident does not occur, it is possible to return the passenger protection device from the second position to the first position, thereby preparing for a next collision.

In the passenger protection apparatus described above, upon an accident, it is possible to rapidly protect the passenger with the passenger protection device driven in the direction approaching the passenger prior to the vehicle accident. When the accident does not actually occur, the passenger protection device is separated from the passenger.

According to a second aspect of the present invention, the passenger protection apparatus of the first aspect includes an air bag capable of expanding and contracting. The driving device includes a gas supply device, a gas discharge device, and an urging device. The gas supply device has a function of supplying gas into the air bag. The gas supply device has an air feeding path for feeding compressed air into the air bag, and an air pump for introducing compressed air into the air feeding path. Air or gas other than air is appropriately applicable. The gas discharge device has a function of discharging gas in the air bag. The gas discharge device comprises an air discharging path for communicating the interior of the air bag with outside. The urging device has a function of urging the air bag toward the first position. The urging device has an elastic member such as a spring or an elastic cord.

In the second aspect of the present invention, when the detecting device foresees a vehicle collision, the control device controls the gas supply device and the gas discharge device to expand the air bag toward the second position against an urging force of the urging device. That is, the gas supply device is activated in a state that the gas discharge device is stopped. Accordingly, it is possible to fill the air bag with gas for expanding the air bag at the second position. When an accident is avoided, the control device controls the gas supply device and the gas discharge device to contract the air bag at the first position with the urging force of the urging device. That is, the gas discharge device is activated in a state that the gas supply device is stopped. As a result, the gas filled in the air bag is discharged outside the air bag, and the air bag is contracted, thereby returning to the first position with the urging device.

In the passenger protection apparatus of the second aspect, it is possible to rapidly protect the passenger with the air bag upon an accident. More specifically, in the passenger protection apparatus, when a vehicle accident is foreseen, the air bag is expanded in advance from the first position, i.e., the housing position, to the second position for a possible collision. Accordingly, it is possible to deploy and expand the airbag in advance in a direction approaching the passenger for rapidly protecting the passenger upon an accident. The air bag is expanded to the second position for protecting the passenger, or may be expanded further from the second position to a third position further closer to the passenger for protecting the passenger. When an accident does not actually occur, the air bag returns from the second position to the first position, thereby preparing for a next collision. In the passenger protection apparatus, it is possible to deploy and expand the air bag in a direction approaching the passenger prior to an accident, thereby rapidly protecting the passenger upon an accident.

According to a third aspect of the present invention, the passenger protection apparatus in the first aspect further comprises an elastic protecting pad member. The protecting pad member may be formed of a foamed material. The driving device has a shaft-shaped ball screw member, a rotation motor, a nut member, and a connecting member. The rotation motor has a function of rotating the ball screw member around a shaft. The nut member engages the ball screw member and moves in an axial direction of the ball screw member along with a rotation of the ball screw member. The connecting member has a function of connecting the protecting pad member and the nut member, so that the protecting pad member can be arranged between the first position and the second position along with a movement of the nut member. The connecting member comprises a linking mechanism combined of a plurality of link frames.

In the third aspect of the present invention, when the detecting device foresees a vehicle collision, the control device controls the rotation motor to arrange the protecting pad member at the second position. That is, the rotation motor rotates in a predetermined direction so that the protecting pad member moves away from the nut member and is situated at the second position. When the collision is avoided, the control device controls the rotation motor so as to arrange the protecting pad member at the first position. In other words, the rotation motor rotates in a direction opposite to the predetermined direction so that the protecting pad member moves toward the nut member and is situated at the first position.

In the passenger protection apparatus in the third aspect, it is possible to rapidly protect the passenger with the protecting pad member driven by the ball screw member, the rotation motor and the like. That is, when a collision is foreseen, the protecting pad member is moved in advance from the first position, i.e., a housing position, to the second position for a possible collision. As a result, it is possible to quickly protect the passenger upon an accident with the protecting pad member moved in advance in the direction approaching the passenger. Upon an accident, the protecting pad member situated at the second position protects the passenger, or the protecting pad member may be moved to a third position further closer to the passenger from the second position for protecting the passenger. When a collision does not actually occur, it is possible to return the protecting pad member from the second position to the first position, thereby being ready for a next collision. In the passenger protection apparatus, it is possible to rapidly protect the passenger upon an accident.

In the third aspect, the connecting member may be an elastically deformable member or a plastically deformable member. Upon an accident, it is possible to absorb an impact on the passenger with elasticity of the protecting pad member as well as the connecting member.

According to a fourth aspect of the present invention, the passenger protection apparatus in the first aspect further comprises an elastic protecting pad member. The pad member may be made of a foamed material. The driving device is formed of a bag-shaped member, a gas supply device, a gas discharge device, and an urging device. The bag-shaped member is attached to the protecting pad member and has a function of expanding and contracting, i.e., a typical structure of an air bag. The gas supply device has a function of supplying gas to an interior of the bag-shaped member. The gas supply device comprises an air feeding path for feeding air into the bag-shaped member, and an air pump for introducing compressed air into the air feeding path. Air or gas other than air may be appropriately used. The gas discharge device has a function of discharging gas from the interior of the bag-shaped member. The gas discharge device is formed of an air discharging path for communicating the interior of the bag-shaped member with outside. The urging device has a function of urging the bag-shaped member toward the first position. The urging device comprises an elastic member such as a spring or a rubber cord.

In the fourth aspect of the present invention, when the detecting device foresees a vehicle collision, the control device controls the gas supply device and the gas discharge device so as to arrange the protecting pad member at the second position. More specifically, the gas supply device is activated in a state in which an operation of the gas discharge device is discontinued. As a result, the bag-shaped member is filled with gas, thereby arranging the protecting pad member secured to the bag-shaped member at the second position. When the vehicle collision is avoided, the control device controls the gas supply device and the gas discharge device so as to contract the bag-shaped member, and arrange the protecting pad member at the first position with the urging force of the urging device. That is, the gas discharge device is activated in a state in which an operation of the gas supply device is discontinued. Accordingly, gas is discharged from the bag-shaped member to contract the bag-shaped member, thereby returning the protecting pad member to the first position with the urging device.

In the passenger protection apparatus in the fourth aspect, similar to the passenger protection apparatus in the third aspect, the protecting pad member is moved with the bag-shaped member and the urging device in the direction approaching the passenger prior to a vehicle collision, so that the passenger is rapidly protected upon an accident.

According to a fifth aspect of the present invention, in the passenger protection apparatus in one of the first to fourth aspects, the second position is defined as a position corresponding to a passenger protection region in which the passenger is protected. The control device controls the driving device so as to arrange the passenger protection device at the second position upon a vehicle accident. Accordingly, it is possible to protect the passenger with the passenger protection device arranged at the second position.

In the passenger protection apparatus in the fifth aspect, when a vehicle collision is foreseen, the passenger protection device is moved in advance from the first position, i.e., the housing position, to the second position for a possible collision. Upon an actual accident, the passenger protection device arranged at the second position protects the passenger, thereby making it possible to rapidly protect the passenger upon an accident.

According to a sixth aspect of the present invention, in the passenger protection apparatus in one of the first to fourth aspects, the second position is defined as a position close to a vehicle side away from the passenger protection region for protecting the passenger. Upon a vehicle accident, the control device controls the driving device so as to arrange the passenger protection device at the third position corresponding to the passenger protection region. Accordingly, it is possible to protect the passenger with the passenger protection device arranged at the third position closer to the passenger than at the second position. That is, the passenger protection device stands by at the second position between the first and the third positions prior to a vehicle collision. When the collision is avoided, the passenger protection device is moved to the first position. When the accident occurs, the passenger protection device is moved to the third position.

In the sixth aspect of the present invention, the driving device drives the passenger protection device from the first position to the third position, and may be formed of a single device or a combination of several devices. For example, a first driving device may be used for reversibly driving the passenger protection device between the first and the second positions, and a second driving device different from the first driving device may be used for driving the passenger protection device from the second position to the third position. The passenger protection device may move between the second and the third positions in both directions, or may move only from the second position to the third position.

In the passenger protection apparatus in the sixth aspect, it is possible to hold the passenger protection device on standby at the second position closer to the passenger than at the first position prior to a vehicle collision, so that the passenger is rapidly protected upon an accident. It is also possible to hold the passenger protection device on standby at the second position further away from the passenger than the third position, so that the passenger protection device does not become an obstacle prior to a vehicle collision.

According to the present invention, the passenger protection apparatus is applicable to a curtain air bag apparatus installed above a sidewall of a vehicle having two or more rows of seats. In such a curtain air bag apparatus, an air bag has a relatively large capacity, and it takes a relatively long period of time to completely deploy and expand the air bag in a passenger protection region. It is also necessary to rapidly deploy and expand the air bag, thereby making the passenger protection apparatus particularly useful.

According to a seventh aspect of the present invention, in the passenger protection apparatus in one of the first to sixth aspects, the passenger protection device is mounted on a sidewall of the vehicle. The sidewall includes a member disposed on a side (right or left) of the passenger such as a side door trim, a pillar, and a side roof rail.

In the present invention described above, the passenger protection device is moved in the directions approaching and away from the passenger. When a vehicle collision is foreseen, it is possible to rapidly protect the passenger upon an accident with the passenger protection device arranged in advance at a position close to-the passenger.

According to an eighth aspect of the present invention, a passenger protection apparatus mounted on a vehicle comprises at least a passenger protecting device, a driving device, and a control device. The passenger protecting device is attached to a vehicle seat for protecting a passenger upon a vehicle accident. The passenger protecting device includes an airbag and a protecting pad member with elasticity for absorbing an impact force acting on the passenger upon a vehicle accident.

The passenger protecting device is installed at a portion of the vehicle corresponding to a part of the passenger to be protected. The part of the passenger to be protected by the passenger protecting device includes a head, neck, shoulder, chest, abdomen, knee, and lower limbs. The passenger protecting device protects a passenger moving toward a side of the vehicle upon a vehicle accident, or prevents a so-called submarine phenomenon, in which a passenger moves and slips downwardly forward in the seat or through a seat belt diagonally upon a vehicle accident.

The driving device moves the passenger protecting device reversibly between an ordinary housed state and a collision-preparing state. In other words, the passenger protecting device is operated with the driving device between the ordinary housed state and the collision-preparing state.

The control device controls the driving device. When a vehicle collision is predicted, the control device controls the driving device so as to move the passenger protecting device from the ordinary housed state to the collision-preparing state prior to the vehicle collision. When the vehicle collision is avoided, the control device controls the driving device so as to return the passenger protecting device from the collision-preparing state to the ordinary housed state.

The ordinary housed state is typically defined as an ordinary initial state in which the passenger protecting device is housed in a normal state. The collision-preparing state is a state for preparing an actual vehicle collision upon the collision (a preliminary state). The collision-preparing state includes a state that the passenger protecting device is arranged in a region corresponding to a passenger protecting region where passenger protection is performed upon a vehicle accident, or a state that the passenger protecting device is arranged in a region different from the passenger protecting region. More specifically, the passenger protecting device may carry out passenger protection as it is in the ordinary housed state, or may conduct passenger protection after moving to a state other than the ordinary housed state. In order to quickly protect a passenger upon a vehicle accident, it is preferable to arrange the passenger protecting device closer to the vehicle passenger in the collision-preparing state than in the ordinary housed state.

In the eighth aspect described above, when a vehicle collision is foreseen, it is possible to move in advance the passenger protecting device from the ordinary housed state to the collision-preparing state for the possible collision. Accordingly, it is possible to quickly protect a passenger upon an accident since the passenger protecting device moves in advance to the collision-preparing state. The passenger protecting device having such a configuration is effective for ensuring rapid passenger protection as compared with the passenger protecting device having a configuration operating upon an accident. After foreseeing a vehicle accident, when the accident does not occur actually, it is possible to return the passenger protecting device from the collision-preparing state to the ordinary housed state, thereby coping with a next collision.

In the vehicle passenger protection apparatus described above, the passenger protecting device is set in advance in the collision-preparing state prior to an actual vehicle accident. Accordingly, it is possible to rapidly cope with passenger protection upon an accident. Particularly, the passenger protecting device is attached to the vehicle seat arranged in close contact with the vehicle passenger. Accordingly, it is possible to rapidly cope with passenger protection upon a vehicle accident. When an accident does not actually occur, the passenger protecting device is separated from the passenger.

According to a ninth aspect of the present invention, in the passenger protecting device in the eighth aspect, an expandable and contractible airbag is provided. The driving device includes a gas supplying device and a gas discharging device. The gas supplying device feeds gas into the airbag. Typically, the gas supplying device is composed of an air feeding path for feeding compressed air into the airbag, and an air pump for introducing compressed air into the air feeding path. Air or gas other than air is appropriately applicable. The gas discharging device discharges gas from the airbag. Typically, the gas discharging device comprises an air discharging path communicating the interior of the airbag with outside.

When a vehicle collision is foreseen, the control device controls the gas supplying device and the gas discharging device so as to expand the airbag into the collision-preparing state. That is, the gas supplying device is activated while an operation of the gas discharging device is stopped. Accordingly, it is possible to fill the airbag with gas and expand the airbag into the collision-preparing state. When an accident is avoided, the control device controls the gas supplying device and the gas discharging device so as to contract the airbag into the ordinary housed state. That is, the gas discharging device is activated while an operation of the gas supplying device is stopped. As a result, gas filled in the airbag is discharged outside the airbag, and the airbag is contracted, thereby returning the airbag to the ordinary housed state.

In the vehicle passenger protection apparatus in the ninth aspect described above, it is possible to rapidly protect a passenger with the airbag upon a vehicle accident. More specifically, when a vehicle accident is foreseen, the airbag is expanded in advance from the ordinary housed state to the collision-preparing state, thereby coping with a possible collision. Accordingly, the airbag is deployed and expanded in advance into the collision-preparing state for rapidly protecting a passenger upon an accident. Upon an accident, the airbag is expanded into the collision-preparing state as is for protecting the passenger, or the airbag is expanded further from the collision-preparing state to a further deployed and expanded state for protecting the passenger.

When the foreseen vehicle accident does not actually occur, the airbag returns from the collision-preparing state to the ordinary housed state, thereby coping with a next collision. With the vehicle passenger protection apparatus, it is possible to deploy and expand the airbag into the collision-preparing state prior to an accident, thereby rapidly protecting a passenger upon an accident.

According to a tenth aspect of the present invention, the airbag in the ninth aspect is provided with an airbag cover for covering the airbag and forming a part of a vehicle seat. The airbag cover moves between a first set position for covering the airbag in the ordinary housed state and a second set position for allowing the airbag to expand into the collision-preparing state. With such a configuration, a part of the vehicle seat is simultaneously used as the airbag cover covering the airbag.

According to an eleventh aspect of the present invention, the airbag cover in the tenth aspect is elastically urged with an elastic spring toward the first set position. The elastic spring includes various elastic springs such as a coil-shaped and a sheet-shaped spring capable of elastically urging. When the airbag is expanded into the collision-preparing state, the airbag presses the airbag cover against an urging force of the elastic spring from the first set position to the second set position. When the airbag is contracted into the ordinary housed state, the airbag is pressed into the ordinary housed state with the airbag cover moving to the first set position with the elastic urging force of the elastic spring. With such a configuration, it is possible to operate the airbag cover with the expansion force of the airbag and the elastic urging force of the elastic spring, thereby obtaining a simple structure.

According to a twelfth aspect of the present invention, in the vehicle passenger protection apparatus in one of the eighth to eleventh aspects, the passenger protecting device in the collision-preparing state is arranged in a region substantially corresponding to the passenger protecting region where the vehicle passenger is protected. The control device controls the driving device to hold the passenger protecting device in the collision-preparing state upon a vehicle accident, thereby protecting a passenger with the passenger protecting device. With such a configuration, when a vehicle collision is foreseen, the passenger protecting device moves from the ordinary housed state to the collision-preparing state in advance for a possible next accident. When an actual vehicle accident occurs, it is possible to protect a passenger with the passenger protecting device operating in the collision-preparing state as is, thereby rapidly protecting the passenger upon the vehicle accident.

According to a thirteenth aspect of the present invention, in the vehicle passenger protection apparatus in one of the eighth to eleventh aspects, the passenger protecting device in the collision-preparing state is arranged in a region different from the passenger protecting region where the vehicle passenger is protected. The control device controls the driving device to move the passenger protecting device to the collision-preparing state prior to a vehicle collision, and further move the passenger protecting device from the collision-preparing state to the passenger protecting state corresponding to the passenger protecting region upon the vehicle accident, thereby protecting a passenger with the passenger protecting device.

With such a configuration, when a vehicle accident is foreseen, it is possible to move the passenger protecting device from the ordinary housed state to the collision-preparing state in advance for a possible accident. When a vehicle accident actually occurs, the passenger protecting device in the collision-preparing state is further moved to the passenger protecting state for passenger protection. For example, a state in which the passenger protecting device stands by prior to the vehicle collision and does not disturb a passenger can be set as the collision-preparing state. Accordingly, it is possible to perform a series of operations of the passenger protecting device from the ordinary housed state to the passenger protecting state through the collision-preparing state. In the present invention, it is sufficient that the passenger protecting device is reversibly moved at least between the ordinary housed state and the collision-preparing state. The operation between the collision-preparing state and the passenger protecting state may be reversible or irreversible.

According to a fourteenth aspect of the present invention, a vehicle is provided with the passenger protecting device in one of the eighth to thirteenth aspects for protecting a passenger upon a vehicle accident.

According to a fifteenth aspect of the present invention, a passenger-protecting vehicle includes at least a detecting device, a vehicle seat, a passenger protecting device, a driving device, and a control device.

The detecting device detects information about a collision of a vehicle. The information detected by the detecting device include information for predicting (determining) whether a vehicle collides with an object of collision such as another vehicle or an obstacle, i.e., a distance from the object and a relative speed. Typically, the detecting device uses a radar such as a milli-wave radar and a laser radar for detecting (measuring) the distance from an object of collision, or the relative speed by generating waves having a wavelength of a few millimeters (milli-waves or laser waves) toward the object of collision, and measuring reflected waves from the object of collision.

The vehicle seat is provided for seating one or more vehicle passengers. The passenger protecting device, the driving device, and the control device have configurations substantially same as those in the passenger protection apparatus in the eighth aspect.

Particularly, the control device controls the driving device based on the information detected by the detecting device. When a vehicle collision is foreseen from the information detected by the detecting device, the control device controls the driving device to move the passenger protecting device from the ordinary housed state into the collision-preparing state prior to the vehicle collision. When the vehicle collision is avoided, the control device controls the driving device to return the passenger protecting device from the collision-preparing state to the ordinary housed state.

In the passenger-protecting vehicle described above, it is possible to move the passenger protecting device to the collision-preparing state prior to a vehicle collision, thereby rapidly protecting a passenger upon a vehicle accident. Particularly, when the passenger protecting device is arranged in a vehicle seat close to a passenger, it is possible to rapidly protect the passenger upon a vehicle accident. When an actual vehicle collision does not occur, the passenger protecting device returns to the ordinary housed state.

In the present invention described above, the passenger protecting device is reversibly operable between the ordinary housed state and the collision-preparing state. Accordingly, it is possible to achieve a highly efficient technique of rapidly coping with passenger protection upon an accident. The passenger protecting device moves from the ordinary housed state into the collision-preparing state prior to a vehicle accident. Accordingly, when a vehicle collision is foreseen, it is possible to rapidly protect a passenger upon the vehicle accident.

BRIEF DESCRIPTION OF THE DRAWINGS

FIG. 5 is a view showing an air bag retained in a retainer of a passenger protection apparatus according to a second embodiment of the present invention;

FIG. 6 is a view showing a process of deploying and expanding the air bag of the passenger protection apparatus shown in FIG. 5;

FIG. 11 is a view showing the operation of the protecting pad member of the passenger protection apparatus in FIG. 8;

DETAILED DESCRIPTION OF PREFERRED EMBODIMENTS

Hereunder, embodiments of the present invention will be described with reference to the accompanying drawings. According to a first set of embodiments of the present invention, passenger protection apparatus 100 and 300 will be described with reference to FIGS. 1 to 7. According to a second set of embodiments of the present invention, passenger protection apparatus 400, 500, and 600 will be described with reference to FIGS. 8 to 17. The first set of embodiments is broadly classified as cases using an air bag for passenger protection, and the second set of embodiments is broadly classified as cases using a movable protecting pad for passenger protection. In FIGS. 1 to 17, the passenger protection apparatus are installed on a right side of a vehicle compartment.

Figure 1:
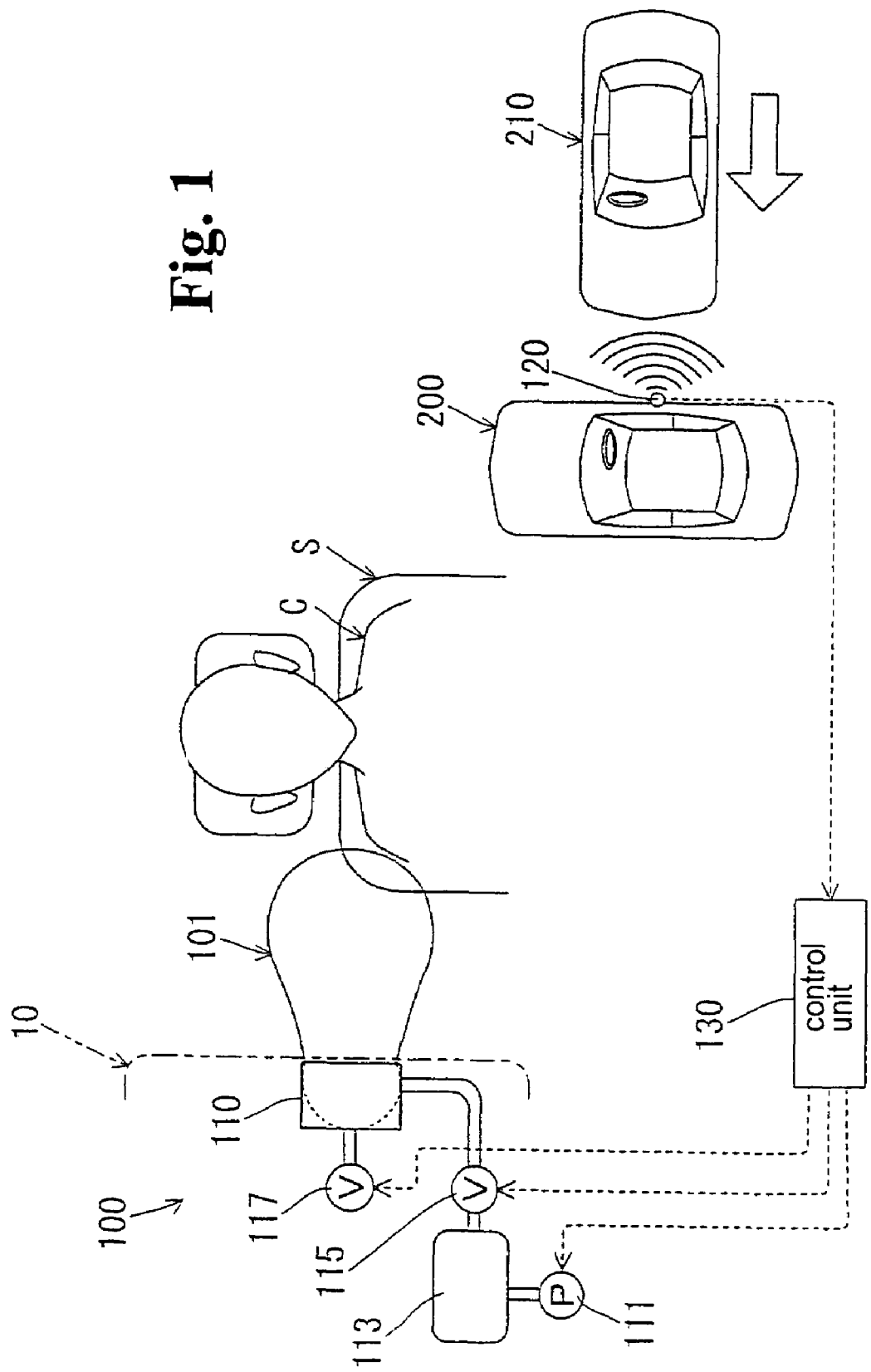
FIG. 1 is a schematic view showing a passenger protection apparatus attached to a right sidewall of a vehicle according to a first embodiment of the present invention.

A passenger protection apparatus 100 is attached to a right sidewall 210 of a vehicle 200 (automobile) as shown in FIG. 1. A right sidewall 10 includes a side door trim and a pillar of the vehicle. The passenger protection apparatus 100 may be attached to a side portion of the seat facing the interior right sidewall 10 (right side end of the seat). As shown in FIG. 1, the passenger protection apparatus 100 has a function of protecting a passenger C sitting in a seat S of the vehicle 200 upon a vehicle accident such as a side collision or a roll-over of the vehicle 200. The passenger protection apparatus 100 mainly comprises an air bag 101, a retainer 110, an air pump 111, an air tank 113, a filling valve 115, a discharging valve 117, a radar sensor 120, and a control unit (ECU) 130.

Upon a vehicle accident such as a side collision or a roll-over of the vehicle 200, the air bag 101 is deployed in a passenger protection region between the passenger C and the right sidewall 10 for protecting the passenger C. In this embodiment, the air bag 101 is structured to be expandable and contractible, and is deployed and expanded in the passenger protection region prior to a collision of the vehicle 200. Before deployment and expansion, the air bag 101 is housed in a retainer 110 in a predetermined folded state in advance. The air bag 101 corresponds to a passenger protection device in the present invention.

Figure 2:
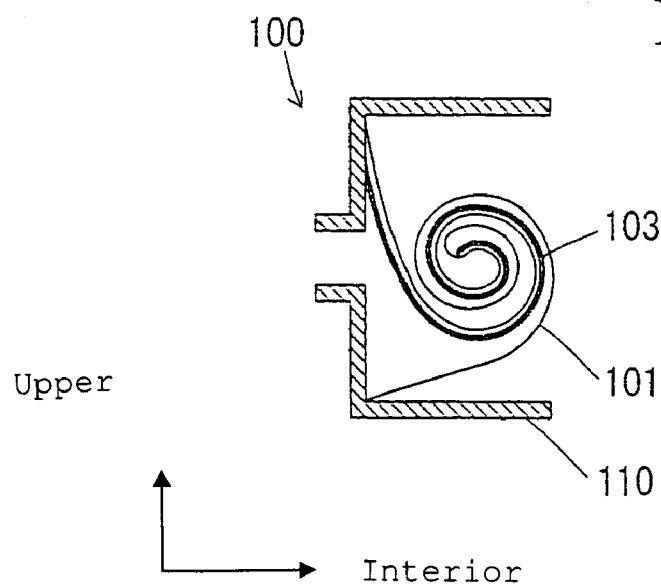
FIG. 2 is a view showing an air bag retained in a retainer of the passenger protection apparatus shown in FIG. 1.

A structure of the air bag 101 will be described in detail with reference to FIG. 2. FIG. 2 illustrates the air bag 101 housed in the retainer 110 of the passenger protection apparatus 100 shown in FIG. 1. In FIG. 2, the right side represents an inside of the compartment. As shown in FIG. 2, a spring member 103 is secured to an inner wall of the air bag 101. The spring member 103 is a spring for applying an elastic urging force to the air bag so that the air bag 101 in a roll shape is housed in the retainer 110. More specifically, a spring member 103 may be made of a resin formed into a coil shape. When air is not fed into the air bag 101, the air bag 101 is housed in the retainer in the roll form. The spring member 103 corresponds to an urging device in the present invention.

As shown in FIG. 1, the air pump 111 compresses air (to a higher pressure) and supplies compressed air to the air tank 113. The air tank 113 is provided for temporarily storing compressed air supplied from the air pump 111. The filling valve 115 is installed in an air feeding path provided between the air bag 101 housed in the retainer 110 and the air tank 113 for opening and closing the air feeding path. A gas supply device and a driving device in the present invention are formed of the air feeding path, the air pump 111, the air tank 113, the filling valve 115, and the like. The discharging valve 117 is installed in the air discharging path communicating the air bag 101 housed in the retainer with outside for opening and closing the air discharging path. A gas discharge device in the present invention is formed of the air discharging path, the discharging valve 117, and the like.

The radar sensor 120 is mounted on the sidewall of the vehicle 200 for detecting a collision between the vehicle 200 (vehicle 210 in FIG. 1) and an object or an automobile at a side. More specifically, the radar sensor emits electromagnetic waves having a wavelength of few millimeters (milliwave or a laser beam) toward the object and measures the waves reflected at the object for detecting (measuring) detection information (detection signal) such as a distance to the object and a relative speed. The radar sensor 120 includes a milli-wave radar or laser radar, and corresponds to a detecting device in the present invention.

Although not specifically shown, the control unit 130 comprises a CPU (central processing unit), an input/output unit, a storage unit, and a peripheral device. In the embodiment, the control unit 130 is electrically connected to the air pump 111, the filling valve 115, the discharging valve 117, and the radar sensor 120 for exchanging detection signals and control signals. More specifically, detection information (detection signals) detected by the radar sensor 120 is entered the control unit 130 as input signals. The control unit 130 sends an opening signal or a closing signal to the filling valve 115 and the discharging valve 117 based on the input signals from the radar sensor 120. The control unit 130 corresponds to a control device in the present invention. The control unit 130 may control only the passenger protection apparatus 100, or other vehicle component members in addition to the passenger protection apparatus 100.

Although not specifically shown in this embodiment, a detecting sensor is provided on the vehicle 200 for determining whether the vehicle 200 is subjected to an accident such as a collision or roll-over. Detection information (detection signal) detected by the detection sensor is entered the control unit 130 as an input signal. The detection sensor includes a so-called acceleration sensor capable of detecting (measuring) detection information (detection signal) such as acceleration acting on the vehicle in three axial directions (X-axis, Y-axis and Z-axis).

Figure 3:
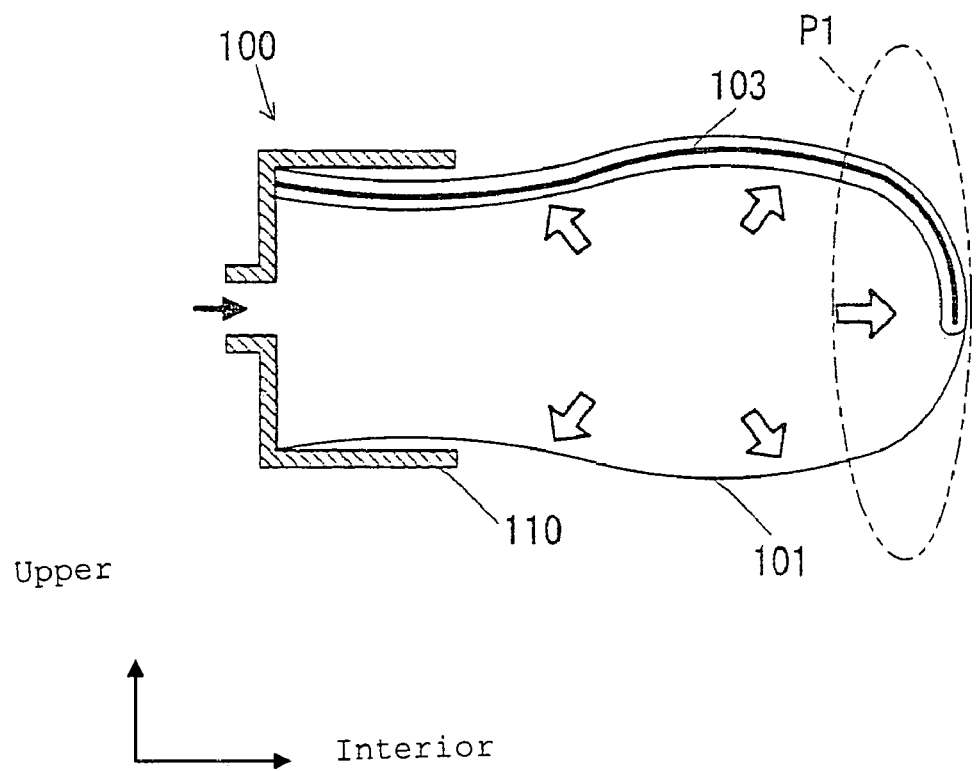
FIG. 3 is a view showing a process of deploying and expanding the air bag of the passenger protection apparatus shown in FIG. 1.
Figure 4:
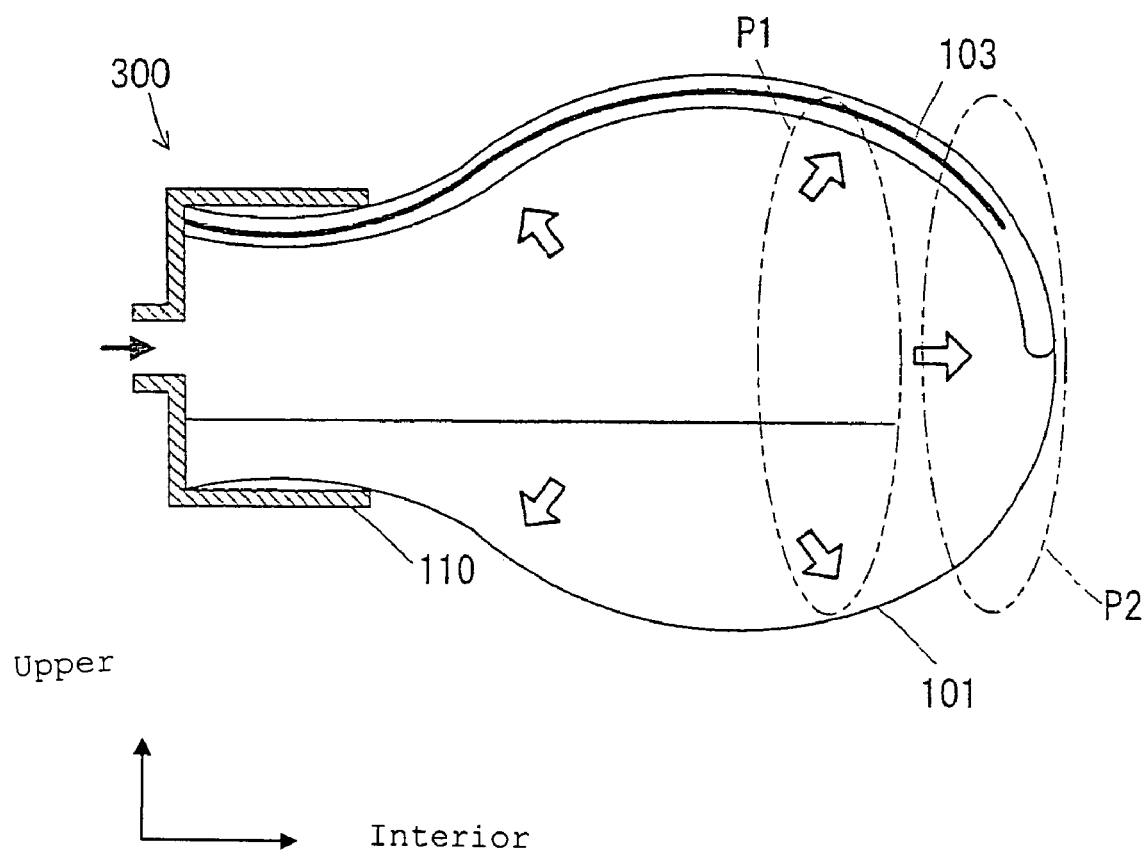
FIG. 4 is a view showing the air bag of the passenger protection apparatus shown in FIG. 1 in a completely deployed and expanded state.

An operation of the passenger protection apparatus 100 having the above-mentioned structure will be described with reference to FIGS. 3 and 4 in addition to FIGS. 1 and 2. FIG. 3 illustrates a process of deploying and expanding the air bag 101 of the passenger protection apparatus 100. FIG. 4 shows the air bag 101 of the passenger protection apparatus 100 in a completely deployed and expanded state. In FIGS. 3 and 4, the right side represents the inside of the compartment.

As shown in FIG. 1, the radar sensor 120 constantly detects information about collision of the vehicle 210 relative to the object of collision (a vehicle or an obstacle) on a side of the vehicle 200, and enters the detected information into the control unit 130. On the basis of the information, the control unit 130 foresees a collision by determining a possibility of collision of the vehicle 200 (one vehicle) with the other vehicle 210 (other vehicle).

When the vehicle 200 is started, the control unit 130 activates the air pump 111 while sending a closing signal to the filling valve 115. Accordingly, a pressure in the air tank is set to a predetermined pressure value. When the radar sensor 120 detects no object on a side of the vehicle 200, i.e., no side collision is foreseen, the control unit 130 outputs an opening signal to the discharging valve 117 and a closing signal to the filling valve 115. As a result, the air bag 101 is not filled with compressed air.

When the radar sensor 120 detects the vehicle 210 near the vehicle 200 and determines a high possibility of a side collision of the vehicle 210 with the vehicle 200, the control unit 130 issues a closing signal to the discharging valve 117 prior to a side collision of the vehicle 200, and outputs an opening signal to the filling valve 115. As a result, air compressed in advance in the air tank 113 is filled (fed) into the air bag 101 through the air feeding path. As shown in FIG. 3, the air bag 101 is deployed and expanded against the elastic urging force of the spring member 103 from the air bag housing position (initial position) shown in FIG. 2. That is, the spring member 103 is stretched out in the air bag 101. FIG. 3 is a view showing the process of deploying and expanding the air bag 101, in which a passenger-side portion of the air bag 101 reaches a middle position P1.

When compressed air is further filled into the air bag 101 from the state shown in FIG. 3, the air bag 101 is further deployed and expanded against the elastic urging force of the spring member 103, and the passenger-side portion of the air bag 101 is deployed and expanded at the passenger protecting position P2. At this point, the control unit 130 issues a closing signal to the filling valve 115, thereby completing the deployment and expansion of the air bag 101. The air bag 101 in a completely deployed and expanded state before a collision is ready for protecting the passenger upon a side collision of the vehicle 210 with the vehicle 200.

The air bag housing position (the initial position shown in FIG. 2) of the air bag 101 corresponds to a first position in the present invention. The middle position P1 of the air bag 101 corresponds to a second position in the present invention. The passenger protecting position P2 of the air bag 101 corresponds to the second position or a third position in the present invention.

When the vehicle 210 actually collides with the vehicle 200, i.e., the detecting sensor detects the collision, the air bag 101 is completely deployed and expanded at the passenger protecting position P2 prior to the collision, thereby absorbing an impact force acting on the passenger to protect the passenger.

Although it is determined to be likely that the vehicle 210 collides with the vehicle 200, when the collision is avoided and the radar sensor 120 detects no object on a side of the vehicle 200, the control unit 130 controls the air bag 101 to move into the retainer 110. More specifically, the control unit 130 issues an opening signal to the discharging valve 117 to discharge air in the air bag 101 via the air discharging path. As a result, the air bag 101 changes a shape from FIG. 4 to FIG. 3, and is wound into a roll shape with the elastic urging force of the spring member 103, thereby returning to the housing position shown in FIG. 2. That is, the spring member 103 is wound in the air bag 101. In this embodiment, as described above, the air bag 101 is reversibly operable in a direction approaching the passenger and in a direction away from the passenger between the housing position (initial position) shown in FIG. 2 and the passenger protecting position (deployment/expansion completing position) P2 shown in FIG. 4.

In the first set of embodiments, the air bag 101 may have a structure other than that shown in FIG. 2. A structure and an operation of a passenger protection apparatus 300 similar to the passenger protection apparatus 100 will be described with reference to FIGS. 5 to 7. In the passenger protection apparatus 300, an air bag 101 similar to that in the passenger protection apparatus 100 is used.

Figure 7:
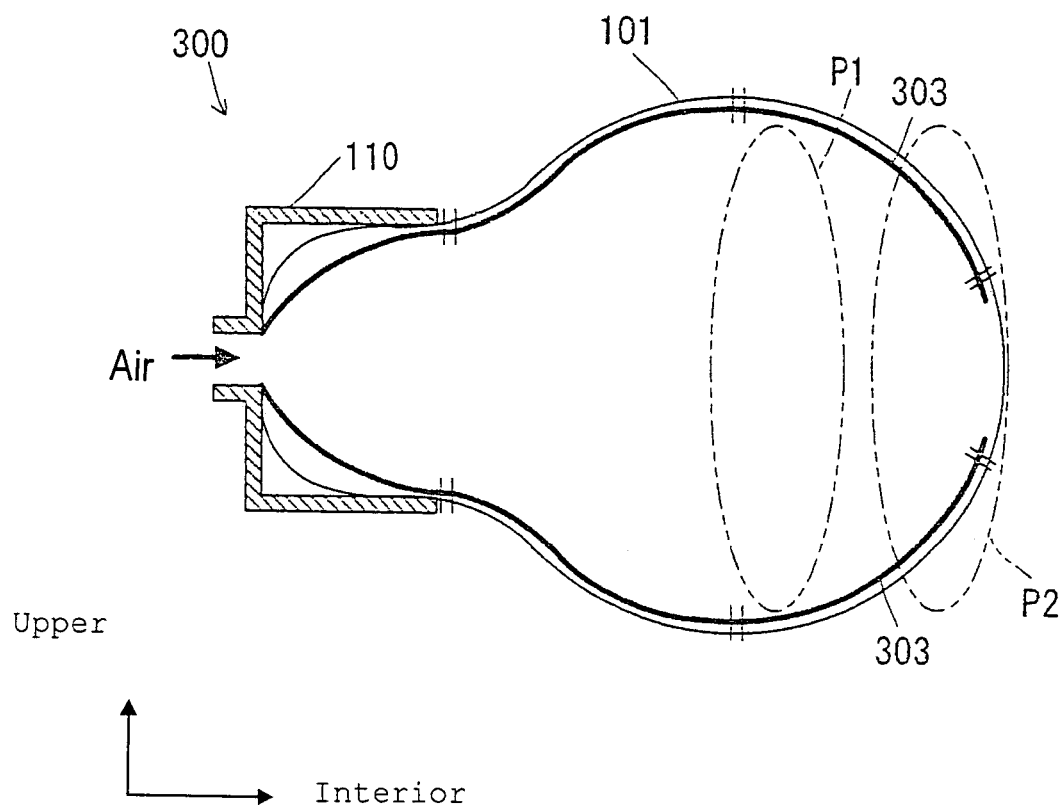
FIG. 7 a view showing the air bag of the passenger protection apparatus shown in FIG. 5 in a completely deployed and expanded state.

FIG. 5 illustrates the air bag 101 housed in the retainer 110 in the passenger protection apparatus 300. FIG. 6 shows the process of deployment and expansion of the air bag 101 in the passenger protection apparatus 300. FIG. 7 shows the air bag 101 upon completion of deployment and expansion in the passenger protection apparatus 300. In FIGS. 5 to 7, the right side of the drawing represents the inside of the compartment.

An elastic member 303 is secured by sewing to an inner wall of the air bag 101 of the passenger protection apparatus 300 shown in FIG. 5. The elastic member 303 has a function of applying an elastic urging force to the air bag 101 so that the air bag 101 folded in a bellow (accordion-shape) shape is housed in the retainer 110. More specifically, an elastic cord member is applicable as an elastic member 303. As a result, when air is not fed into the air bag 101, the air bag 101 is housed in the retainer in a state folded into a bellow shape. The elastic member 303 corresponds to an urging device in the present invention.

In the passenger protection apparatus 300, when the control unit 130 determines that the possibility of a side collision of the vehicle 210 with the vehicle 200 is high, and compressed air is fed to the air bag 101, the air bag 101 is released from the folding state against the elastic urging force of the elastic member 303 as shown in FIG. 6 from the air bag housing position (initial position) shown in FIG. 5, and is deployed and expanded. That is, the elastic member 303 is elongated in the air bag 101. FIG. 6 shows a process of deploying and expanding the air bag 101, in which a passenger-side portion of the air bag 101 reaches a middle point P1.

When the air bag 101 is further filled with compressed air from the state shown in FIG. 6, the air bag 101 is further deployed and expanded against the elastic urging force of the elastic member 303, and the passenger-side portion of the air bag 101 is deployed and expanded to the passenger protecting position P2. The air bag 101 is deployed and expanded completely prior to a collision for protecting the passenger upon a subsequent vehicle collision of the vehicle 210 with the vehicle 200.

When the vehicle 210 actually collides with a side of the vehicle 200, the impact force acting on the passenger is alleviated by the air bag 101 completely deployed and expanded at the passenger protecting position P2 prior to the collision, thereby securely protecting the passenger. On the other hand, when the possibility of the side collision of the vehicle 210 with the vehicle 200 is determined to be high, but the side collision is avoided and the radar sensor 120 no further detects an object of collision on the side of the vehicle 200, the air bag 101 in the state shown in FIG. 7 changes to the state shown in FIG. 6. Then, the air bag 101 is folded into a bellow shape with the elastic urging force of the elastic member 303 and returns to the housing position shown in FIG. 5. That is, the elastic member 303 is contracted in the air bag 101. In this embodiment, as described above, the air bag 101 is reversibly operable in a direction approaching the passenger and in a direction away from the passenger between the housing position (initial position) shown in FIG. 5 and the passenger protecting position P2 (deployment/expansion completing position) shown in FIG. 7.

According to the passenger protection apparatuses 100 and 300 of the first set of the embodiments of the present invention, as described above, it is possible to achieve a structure using the air bag 101 for rapidly protecting the passenger upon an accident. In other words, in this embodiment, when a vehicle collision is foreseen, the air bag 101 is expanded in advance from the housing position to the passenger protecting position P2, thereby making it possible to cope with a possible subsequent accident. As a result, it is possible to rapidly protect the passenger upon an accident by using the air bag 101 expanded to the passenger protecting position P2 prior to vehicle collision. In this embodiment, when a collision does not occur, the air bag 101 returns from the passenger protecting position 22 to the housing position, thereby preparing for a next collision. In the passenger protection apparatuses 100 and 300, it is possible to rapidly protect the passenger upon an accident with the air bag 101 deployed and expanded in a direction approaching the passenger prior to the vehicle collision.

Figure 8:
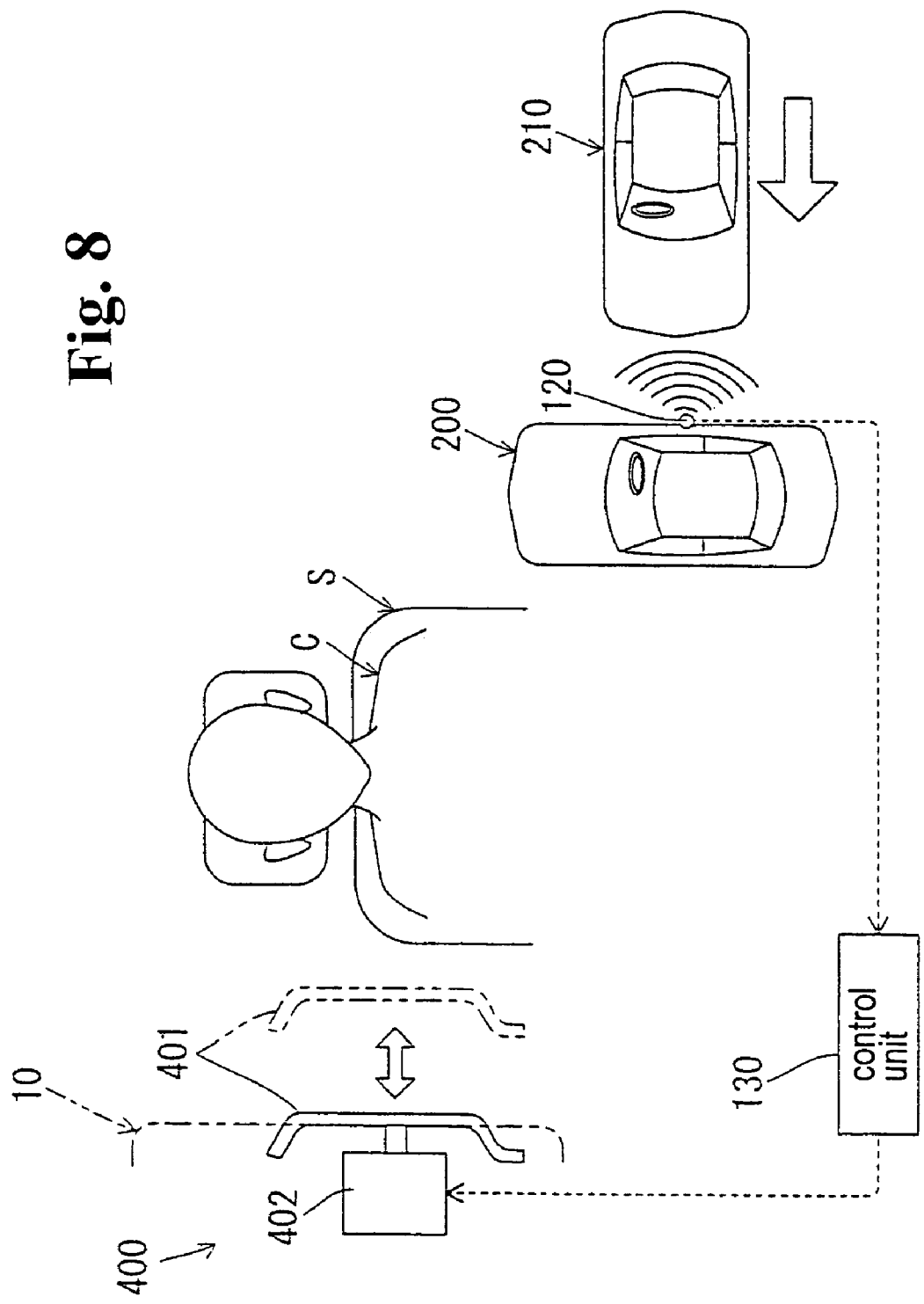
FIG. 8 is a schematic view showing a passenger protection apparatus attached to a right sidewall of a vehicle according to a third embodiment of the present invention.

According to the second set of embodiments of the present invention, a passenger protection apparatus 400 is attached to the right sidewall of a vehicle 200 (automobile) as shown in FIG. 8. The right sidewall 10 includes, as in the first set, a side door trim and a pillar of the vehicle. The passenger protection apparatus 400 may be attached to a portion of the seat side facing the right sidewall 10 (seat right side end).

As shown in FIG. 8, upon a vehicle accident such as a side collision or a roll-over of the vehicle 200, the passenger protection apparatus 400 has a function of protecting a passenger C sitting in a seat S of the vehicle 200. The passenger protection apparatus 400 mainly comprises a protecting pad member 401, an actuator 402, the radar sensor 120 same as that in the first embodiment, and a control unit (ECU) 130.

The protecting pad member 401 is made of a material having an impact absorbing function such as a foamed material, and has a function of protecting the passenger C by intervening at the passenger protecting position (represented by a two-point chain line in FIG. 8) between the passenger C and the right sidewall 10 upon a vehicle accident such as a side collision or a roll-over of the vehicle 200. The details will be described later. In this embodiment, the protecting pad member 401 is driven by the actuator 402 before a collision of the vehicle 200, thereby intervening at the passenger protecting position. The protecting pad member 401 corresponds to the protecting pad member in the present invention. The protecting pad member 401 is mounted on the right sidewall 10 in a state facing the passenger C before an operation, i.e., the initial position of the protecting pad member 401.

Figure 9:
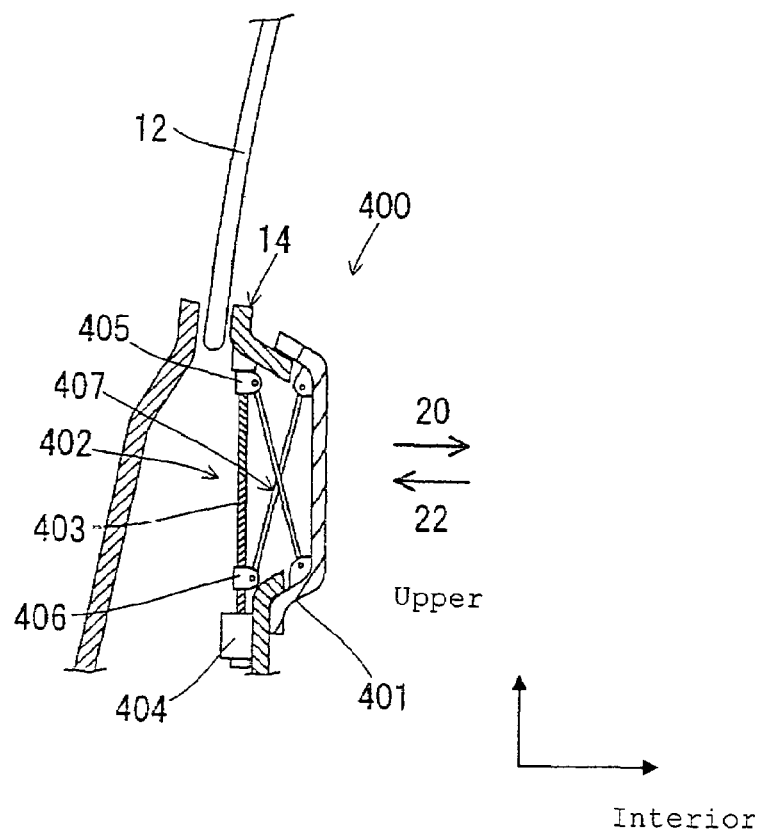
FIG. 9 is a view showing a protecting pad member of the passenger protection apparatus shown in FIG. 8 mounted on a side door trim of the right sidewall at an initial position.

The detailed structure of the actuator 402 will now be described with reference to FIG. 9. FIG. 9 illustrates the protecting pad member 401 of the passenger protection apparatus 400 shown in FIG. 8 attached to the side door trim 141 (below the side window 12) forming a part of the right sidewall 10 at the initial position. In FIG. 9, the right side of the drawing represents the inside of the compartment. As shown in FIG. 9, the actuator 402 mainly comprises a ball screw member 403, a rotation motor 404, a nut member 405, and a linking mechanism. This actuator 402 corresponds to the driving device in the present invention.

The ball screw member 403 is a shaft-shaped ball screw member extending vertically in the vehicle, and has screw threads engaging corresponding screw threads of the nut members 405 and 406. The ball screw member 403 corresponds to a ball screw member in the present invention, and the nut members 405 and 406 correspond to a nut member in the present invention. The rotation motor 404 drives the ball screw member 403 to rotate around the shaft thereof. The rotation motor 404 corresponds to a rotation motor in the present invention.

The linking mechanism 407 connects the nut members 405 and 406 to the protecting pad member 401 via a plurality of link frames. The linking mechanism 407 corresponds to a linking mechanism in the present invention. In this embodiment, the linking mechanism 407 is made of an elastically or plastically deformable material (resin material or metal material). In the actuator 402, when the rotation motor 404 is driven, and the ball screw member 403 is rotated in a predetermined direction, the nut members 405 and 406 move in directions approaching each other. When the rotation motor 404 is driven, and the ball screw member 403 is rotated in a direction opposite to the predetermined direction, the nut members 405 and 406 move in directions away from each other. That is, in this embodiment, the screw threads within a movement range of the nut member 405 are formed in a direction opposite to that of the screw threads within a movement range of the nut member 406 (vertically symmetrical).

As described above, the actuator 402 of the embodiment allows the protecting pad member 401 to operate in the horizontal direction, i.e., in an arrow direction 20 or arrow direction-22 in FIG. 9, and has a function of moving the protecting pad member 401 in the operating direction, i.e., as a stabilizer for controlling the operating direction of the protecting pad member 401.

The control unit 130 is electrically connected to the rotation motor 401 and the radar sensor 120, and exchanges detection signals and control signals with the component members. The control unit 130 issues an operation starting signal or an operation stopping signal to the rotation motor 404 on the basis of input signals from the radar sensor 120.

Figure 10:
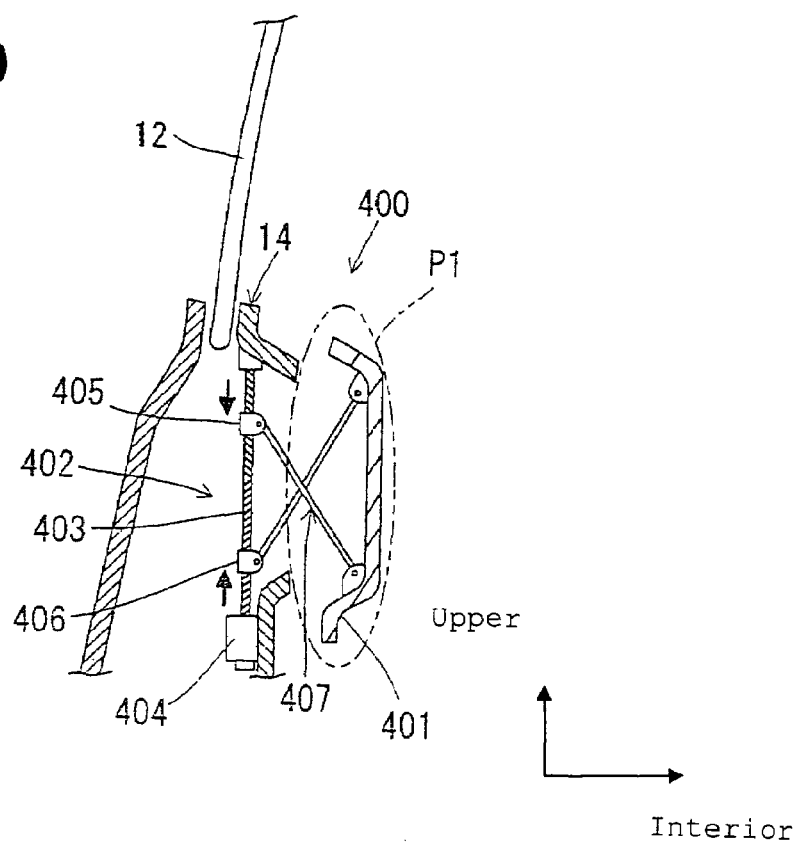
FIG. 10 is a view showing an operation of the protecting pad member of the passenger protection apparatus shown in FIGS. 8.

An operation of the passenger protection apparatus 400 having the above-mentioned structure will be described with reference to FIGS. 10 and 11 in addition to FIGS. 8 and 9. FIG. 10 and FIG. 11 show an operating process of the protecting pad member 401 in the passenger protection apparatus 400. In FIGS. 10 and 11, the right side of the drawing represents the interior of the compartment.

In FIG. 8, when the radar sensor 120 detects no object of collision on a side of the vehicle 200, i.e., no side collision is foreseen, the control unit 130 issues an operation stopping signal to the rotation motor 404. As a result, a state in which the protecting pad member 401 is mounted on the side door trim 14 (the initial position shown in FIG. 9) is maintained.

On the other hand, when a vehicle 210 approaching a side of the vehicle 200 is detected by the radar sensor 120, and it is determined that the possibility of a side collision of the vehicle 200 with the vehicle 210 is high, the control unit 130 issues an operation starting signal in a predetermined rotating direction to the rotation motor 404. Accordingly, the nut members 405 and 406 move in directions approaching each other on the ball screw member 403 prior to the side collision. As a result, the protecting pad member 401 mounted on the side door trim 14 is released, and moves in the arrow direction 20 in FIG. 9. The rotation motor 404 continues the operation, and the protecting pad member 401 passes through the middle point P1 shown in FIG. 10 to reach the passenger protecting position P2 shown in FIG. 11. At this point, the control unit 130 issues an operation stopping signal to the rotation motor 404, thereby completing the operation of the protecting pad member 401. The protecting pad member 401 located at the passenger protecting position P2 prior to the collision is ready for protecting the passenger upon a possible subsequent collision of the vehicle 210 with the vehicle 200.

When the vehicle 210 actually side-collides with the vehicle 200, i.e., a collision is detected by the detecting sensor, the protecting pad member 401 located at the passenger protecting position P2 prior to the collision absorbs an impact force acting on the passenger for protection. In other words, in this embodiment, the impact force acting on the passenger is alleviated by the impact absorbing function of the protecting pad member 401, and the elastic or plastic deformation of the linking mechanism 407. An elastic member such as a spring member may be provided between the right sidewall 10 and the protecting pad member 401 for elastically urging the protecting pad member 401 toward the passenger, thereby further absorbing the impact on the passenger.

After the possibility of a side collision of the vehicle 200 with the vehicle 210 is determined to be high, when the side collision is avoided, and the radar sensor 120 no longer detects an object of collision on a side of the vehicle 200, the control unit 130 issues an operation starting signal in a rotating direction opposite to the prescribed rotating direction to the rotation motor 404, so that the nut members 405 and 406 move in directions away from each other on the ball screw member 403. As a result, as shown in FIG. 11, the protecting pad member 401 arranged at the passenger protecting position P2 moves in the arrow direction 22 in FIG. 9, and after passing through the middle point P1 shown in FIG. 10, returns to the initial position shown in FIG. 9. In this embodiment, as described above, the protecting pad member 401 is reversibly operable in a direction approaching the passenger and a direction away from the passenger between the initial position shown in FIG. 9 and the passenger protecting position P2 shown in FIG. 11.

In the above-mentioned second embodiment, the actuator 402 may have a structure other than that shown in FIG. 9. A structure and operation of a passenger protection apparatus 500 similar to the passenger protection apparatus 400 will be described with reference to FIGS. 12 to 14, and a structure and operation of a passenger protection apparatus 600 similar to the passenger protection apparatus 400 will be described with reference to FIGS. 15 to 17. In the passenger protection apparatuses 500 and 600, a protecting pad member 401 similar to that in the passenger protection apparatus 400 is used.

Figure 12:
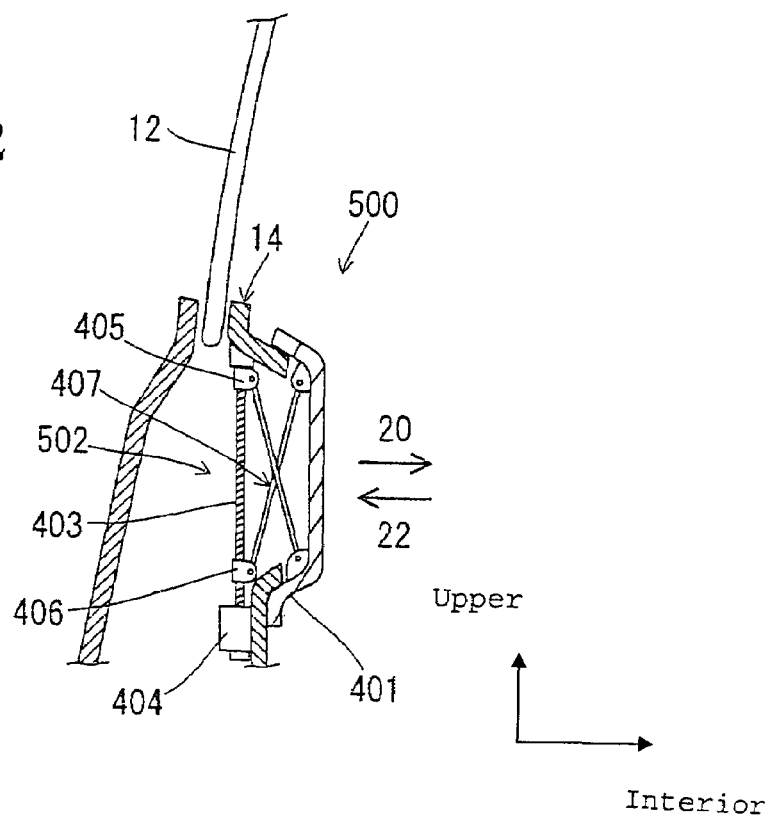
FIG. 12 is a view showing a protecting pad member of a passenger protection apparatus attached to a side door trim according to a fourth embodiment of the present invention.
Figure 13:
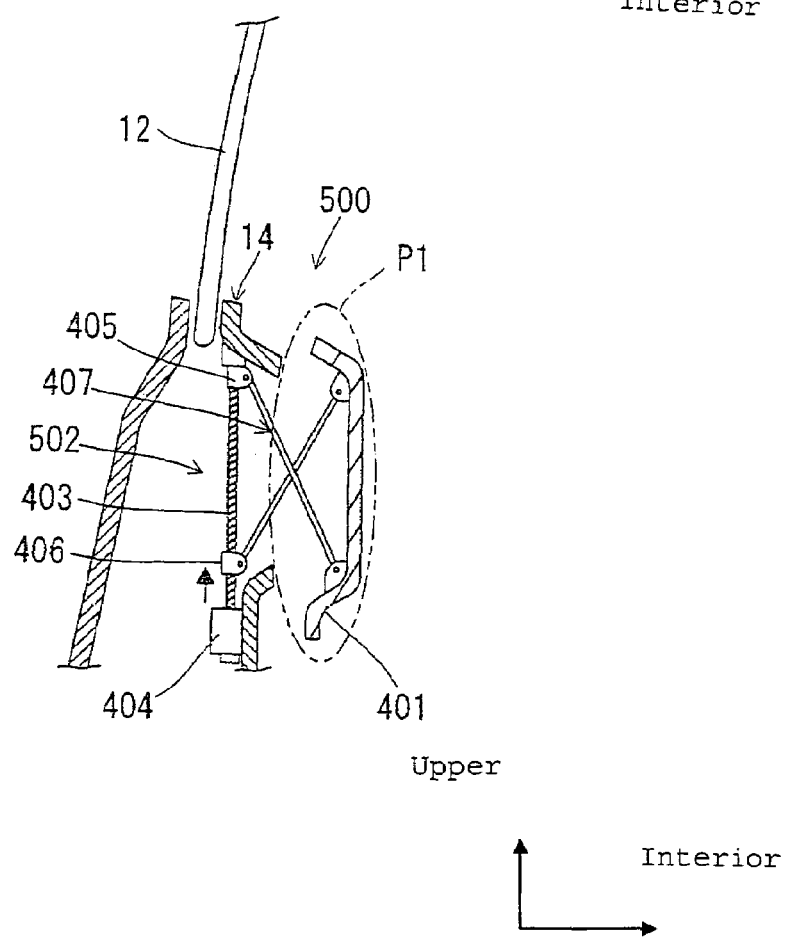
FIG. 13 is a view showing an operation of the protecting pad member of the passenger protection apparatus shown in FIG. 12.
Figure 14:
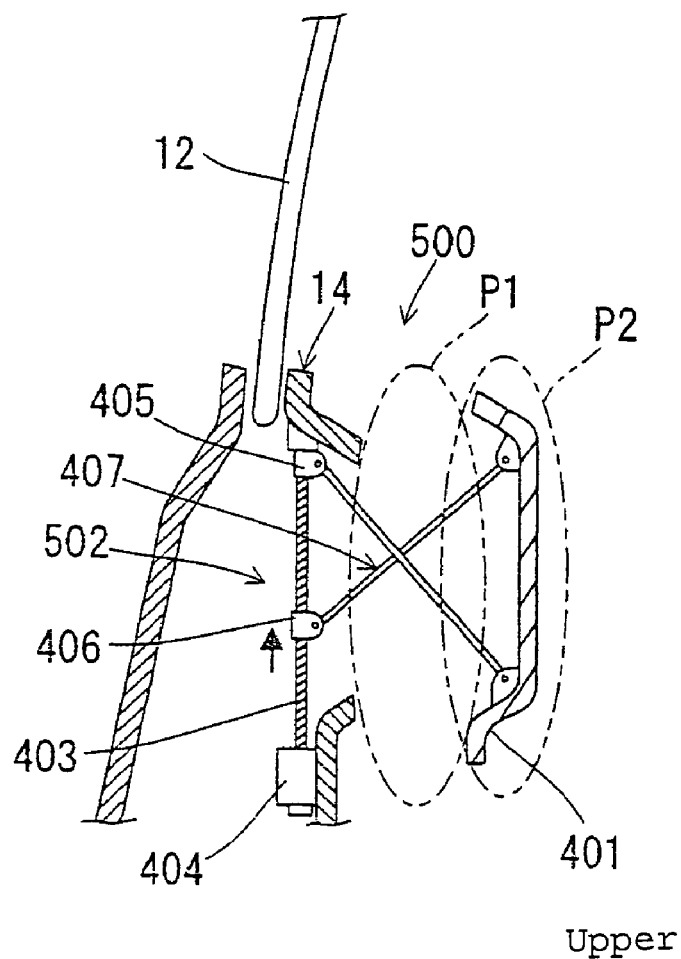
FIG. 14 is a view showing the operation of the protecting pad member of the passenger protection apparatus shown in FIG. 12.
Figure 15:
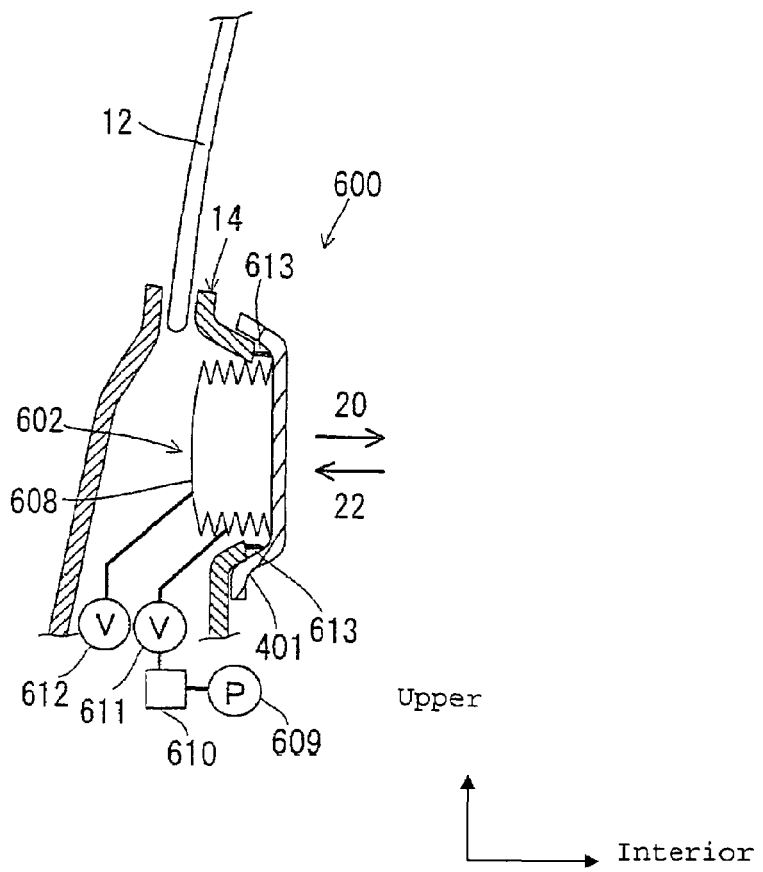
FIG. 15 is a view showing a protecting pad member of the passenger protection apparatus attached to the side door trim according to a fifth embodiment of the present invention.
Figure 16:
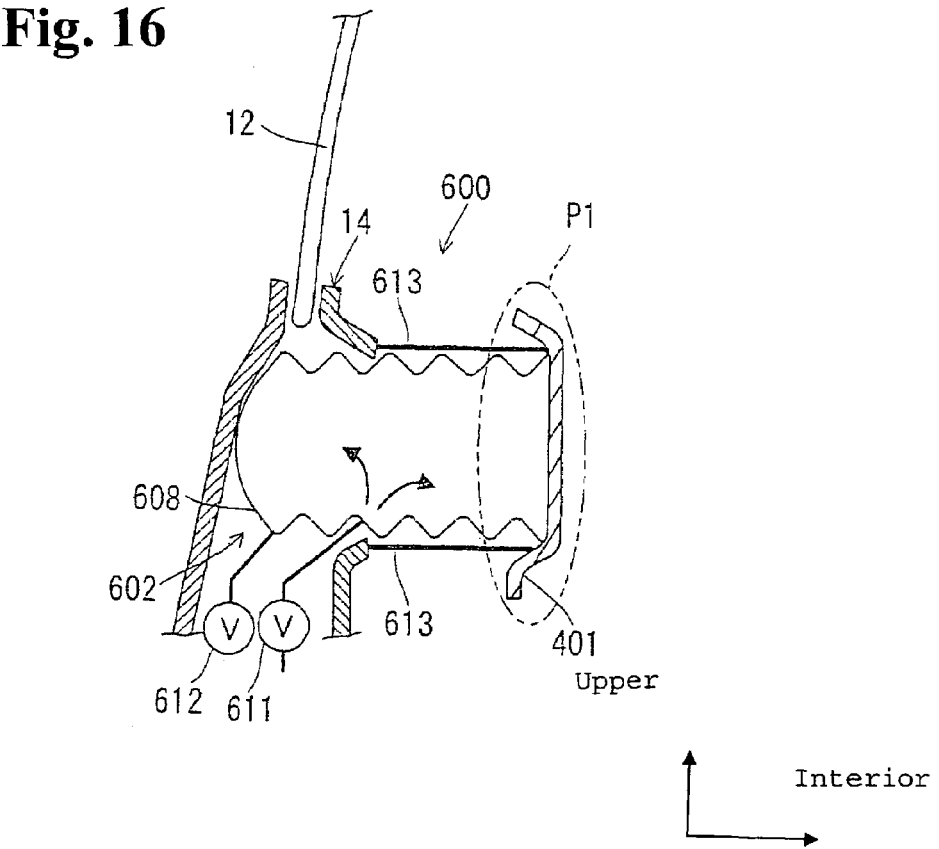
FIG. 16 is a view showing an operation of the protecting pad member of the passenger protection apparatus shown in FIG. 15.
Figure 17:
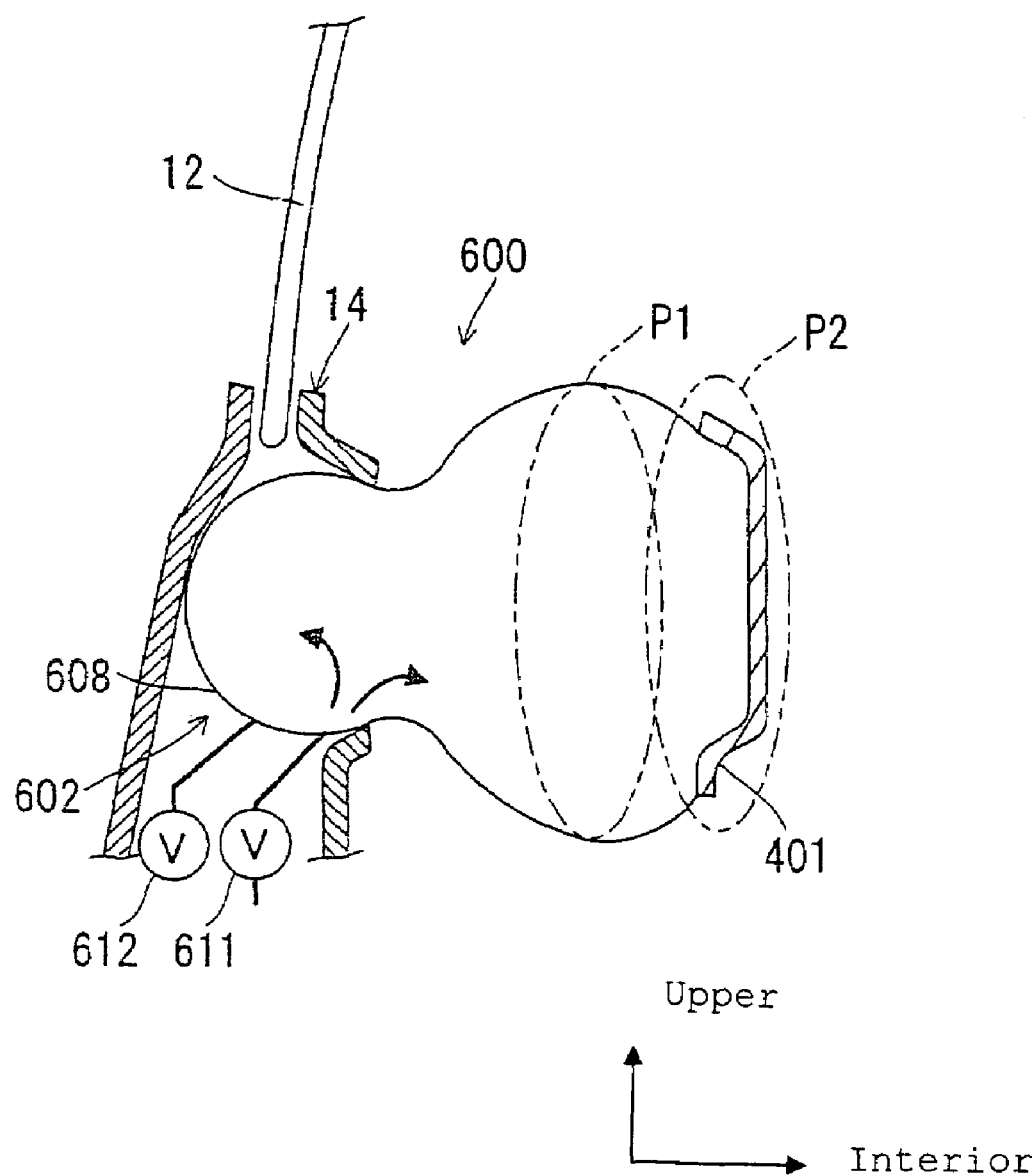
FIG. 17 is a view showing the operation of the protecting pad member of the passenger protection apparatus shown in FIG. 15.

FIG. 12 illustrates the protecting pad member 401 of the passenger protection apparatus 500 mounted on a side door trim 14 at the initial position. FIG. 13 shows the operation of the protecting pad member 401 in the passenger protection apparatus 500. FIG. 14 shows the protecting pad member 401 in the passenger protection apparatus 500 upon completion of the operation. FIG. 15 shows the protecting pad member 401 of the passenger protection apparatus 600 mounted on a side door trim at the initial position. FIG. 16 shows the operation of the protecting pad member 401 in the passenger protection apparatus 600. FIG. 17 shows completion of the operation of the protecting pad member 401 in the passenger protection apparatus 600. In FIGS. 12 to 17, the right side of the drawing represents the interior of the vehicle compartment.

The passenger protection apparatus 500 shown in FIG. 12 has an actuator 502 having substantially the same structure as that of the actuator 402 of the passenger protection apparatus 400 for driving the protecting pad member 401. The actuator 502 corresponds to the driving device in the present invention. In the actuator 502, the nut member 405 is fixed to the ball screw member 403. When the rotation motor 404 is driven and the ball screw member 403 is rotated in a predetermined direction, the nut member 405 does not move and only the nut member 406 moves up (up in FIG. 12) on the ball screw member 403. When the rotation motor 404 is driven, and the ball screw member 403 is rotated in a direction opposite to the predetermined direction, only the nut member 406 moves down (downward in FIG. 12) on the ball screw member 403.

In the passenger protection apparatus 500, when the control unit 130 determines that the possibility of a side collision of the vehicle 200 with the vehicle 210 is high, and an operation starting signal in a predetermined direction is issued to the rotation motor 404 prior to the side collision so that the nut member 406 moves up on the ball screw member 403, the protecting pad member 401 moves in the arrow-direction 20 in FIG. 12. If the control signal in the predetermined rotating direction is continuously issued to the rotation motor 404 from the state shown in FIG. 12, the protecting pad member 401 passes through the middle position P1 as shown in FIG. 13, and reaches the passenger protecting position P2 as shown in FIG. 14. The protecting pad member 401 is situated at the passenger protecting position P2 prior to the collision for protecting the passenger upon a possible subsequent side collision of the vehicle 210 with the vehicle 200.

When the vehicle 200 actually collides with the vehicle 210, the protecting pad member 401 situated at the passenger protecting position P2 prior to the collision absorbs the impact force acting on the passenger for protection. That is, in this embodiment, the impact acting on the passenger is alleviated by the protecting pad member 401 and the elastic or plastic deformation function of the linking mechanism 407. An elastic member such as a spring member may be provided between the right sidewall 10 and the protecting pad member 401 for elastically urging the protecting pad member 401 toward the passenger, thereby further absorbing the impact force acting on the passenger.

After the side collision of the vehicle 200 with the vehicle 210 is determined to be likely, when the collision is avoided and the radar sensor no longer detects an object of collision on the side of the vehicle 200, the protecting pad member 401 in the state shown in FIG. 14 moves in the arrow direction 22 in FIG. 12. After in the state shown in FIG. 13, the protecting pad member 401 returns to the initial state shown in FIG. 12. In this embodiment, as described above, the protecting pad member 401 is reversibly operable in a direction approaching the passenger and in a direction away from the passenger between the initial state shown in FIG. 12 and the passenger protecting position P2 shown in FIG. 14.

The passenger protection apparatus 600 shown in FIG. 15 has an actuator 602 for driving the protecting pad member 401. The actuator 602 corresponds to the driving device in the present invention. In the actuator 602, an expandable and contractible air bag 608 is used for driving the protecting pad member 401. The air bag 608 corresponds to the bag-shaped member in the present invention. Compressed air generated by an air pump 609 is fed to an air feeding path of the air bag 608 via an air tank 610. A filling valve 611 is provided in the air feeding path for opening and closing the air feeding path. The gas supply device in the present invention is formed of the air feeding path, the air pump 609, the air tank 610, the filling valve 611, and the like.

A discharging valve 612 for opening and closing an air discharging path is provided in the air discharging path communicating the air bag 608 with outside. The gas discharge device in the present invention is formed of the air discharging path, the discharging valve 612, and the like. An elastic member 613 is provided between the protecting pad member 401 and the side door trim 14 for urging the protecting pad member 401 toward the side door trim. A coil spring is applicable as the elastic member 613. The elastic member 613 corresponds to the urging device in the present invention.

The control unit 130 is electrically connected to the air pump 609, the filling valve 611, the discharging valve 612, and the radar sensor 120, and exchanges detection signals and control signals with these component members. When the vehicle starts, the control unit 130 activates the air pump 609 in a state in which a closing signal is issued to the filling valve 611. A pressure in the air tank 610 is set in advance to a predetermined value. The control unit 130 issues opening signals or closing signals for the filling valve 611 and the discharging valve 612 on the basis of signals from the radar sensor 120.

In the passenger protection apparatus 600, when the control unit 130 determines that the possibility of a side collision of the vehicle 200 with the vehicle 210 is high, the control unit 130 issues a closing signal to the discharging valve 612 and an opening signal to the filling valve 611 prior to the side collision of the vehicle. As a result, compressed air in the air tank 610 is fed into the air bag 608 via the air feeding path. The air bag 608 is expanded against the elastic urging force of the elastic member 613 as shown in FIG. 16. That is, the elastic member 613 is expanded beyond the initial position shown in FIG. 15, so that the protecting pad member 401 is situated at the middle position P1 shown in FIG. 16.

When filling of compressed air into the air bag 608 is further continued from the state shown in FIG. 16, the air bag 608 is further expanded against the elastic urging force of the elastic member 613, and the protecting pad member 401 is set at the passenger protecting position P2 shown in FIG. 17. Expansion of the air bag 608 is completed upon a closing signal by the control unit 130 to the filling valve 611. The protecting pad member 401 mounted on the passenger side of the air bag 608 is completely expanded before the collision for protecting the passenger upon a possible subsequent side collision of the vehicle 200 with the vehicle 210. When the vehicle 200 actually collides with the vehicle 210, the protecting pad member 401 situated at the passenger protecting position P2 before the collision absorbs the impact force acting on the passenger for protection.

After the possibility of a side collision of the vehicle 200 with the vehicle 210 is determined to be high, when the side collision is avoided, and the radar sensor no further detects an object of collision on a side of the vehicle 200, the control unit 130 issues an opening signal to the discharging valve 612 to discharge air in the air bag 608 to outside via the air discharging path. As a result, the protecting pad member 401 at the passenger protecting position P2 shown in FIG. 17 returns to the initial state shown in FIG. 15 via the middle point P1 shown in FIG. 16. In this embodiment, as described above, the protecting pad member 401 is reversibly operable in a direction approaching the passenger and in a direction leaving the passenger between the initial state shown in FIG. 15 and the passenger protecting position P2 shown in FIG. 17.

According to the passenger protection apparatuses 400, 500 and 600 of the second set of the embodiments of the present invention, as described above, it is possible to achieve a structure using the protecting pad member 401 for rapidly protecting the passenger upon an accident. More specifically, in the embodiments, when a vehicle collision is foreseen, the protecting pad member 401 is arranged from the housing position to the passenger protecting position P2 in advance, thereby being ready for a possible subsequent accident. As a result, the protecting pad member 401 arranged at the passenger protecting position P2 rapidly protects the passenger upon an accident. In the embodiments, when a foreseen collision does not actually occur, it is possible to return the protecting pad member 401 from the passenger protecting position P2 to the housing position for a next collision. In the passenger protection apparatus 400, 500, or 600, as described above, the protecting pad member 401 moves in advance in a direction approaching the passenger prior to the vehicle collision, thereby rapidly protecting the passenger upon an accident.

The present invention is not limited to the above-mentioned embodiments, and various modifications are applicable as shown in the following embodiments.

In the above-mentioned embodiments, the passenger protection apparatuses 100, 300, 400, 500, and 600 are attached and fixed to the side door trim on the right side of the vehicle for protecting the passenger C sitting in a seat on the right side of the vehicle. A passenger protection device can similarly be installed for protecting a passenger sitting in the left seat of the vehicle. The passenger protection device has a structure symmetric to the passenger protection apparatuses 100, 300, 400, 500, and 600, and is attached and fixed to the left-side door trim of the vehicle.

In the present invention, the passenger protection apparatuses 100, 300, 400, 500, and 600 can be attached to a location other than the side door trim in a vehicle. For example, a passenger protection device having a structure similar to that of the passenger protection apparatuses 100, 300, 400, 500, and 600 can be incorporated in a side roof rail, a pillar, a seat (specifically, a side portion including a portion opposite to the vehicle sidewall or the front portion of the seat cushion), a steering wheel, and a dashboard in front of the passenger.

More specifically, the present invention is applicable to a curtain air bag apparatus installed on an upper part of the vehicle sidewall in a vehicle having two or more rows of seats. Such a curtain air bag apparatus has a relatively large capacity of the air bag, so that it takes a relatively long period of time to completely deploy and expand an air bag in the passenger protection region. In order to ensure rapid deployment and expansion of the air bag, it is necessary to set a high deployment/expansion speed. The passenger protection apparatuses of the invention are therefore particularly useful.

Upon a vehicle accident, the passenger sitting in a seat tends to move forward from the seat or diagonally and downwardly from the seat by slipping through the seat belt. The present invention is applicable to a passenger protection device for preventing such a movement called a submarine phenomenon. For example, an expandable article such as an air bag may be disposed in a front portion of a seat cushion. When a vehicle collision is foreseen, the expandable article is expanded to lift the front portion of the seat cushion and a leg of the passenger upwardly, thereby preventing the submarine phenomenon. Alternatively, a protecting pad (protecting board) may be disposed in the front portion of the seat cushion. When a vehicle collision is foreseen, the protecting pad (protecting board) moves up above the seat to lift a leg of the passenger.

As described above, the present invention is not limited to the passenger protection apparatus for a side collision, and may be applicable to a passenger protection apparatus for a front collision.

In the above-mentioned embodiments, the passenger protection device such as the air bag 101 and the protecting pad member 401 is arranged at the passenger protecting position P2 before a vehicle collision, so that the passenger is protected at the passenger protecting position P2 upon the vehicle accident. In the present invention, the passenger protection device may be arranged at a position further toward the vehicle than the passenger protecting position P2 prior to the vehicle collision. More particularly, the passenger protection device may be arranged at a middle position P1 (the second position in the present invention) in advance for protection before a vehicle collision. Upon occurrence of the vehicle accident, the passenger protection device moves from the middle position P1 to the passenger protecting position P2 (the third position in the present invention).

In the passenger protection apparatuses 400, 500, and 600, the air bag and the inflator for feeding gas to the air bag may be housed in the protecting pad member 401. In this structure, the protecting pad member 401 is arranged in advance at the middle position P1 (the second position in the present invention) with the actuator before the vehicle collision for protection. Upon the vehicle accident, the passenger protection device moves from the middle position P1 to the passenger protecting position P2 (the third position in the present invention). The passenger protection device may have a structure in which, after the accident, the passenger protection device returns from the passenger protecting position P2 to the middle position P1, or the passenger protection device does not return from the passenger protecting position P2 to the middle position P1.

In the above-mentioned embodiments, the passenger protection apparatus mounted on an automobile have been described. The present invention is also applicable to a passenger protection apparatus mounted on any vehicles other than an automobile such as a train, a ship and the like.

A passenger protection apparatus 100' according to the present invention will be explained with reference to FIGS. 18 to 23. In this embodiment, an airbag is used as a passenger protecting device for protecting a passenger. In FIGS. 18 to 23, the passenger protection apparatus protects a passenger in a vehicle seat on a right side, and is applicable to a passenger in a vehicle seat such as a driver seat, a passenger seat, and a rear seat.

Figure 18:
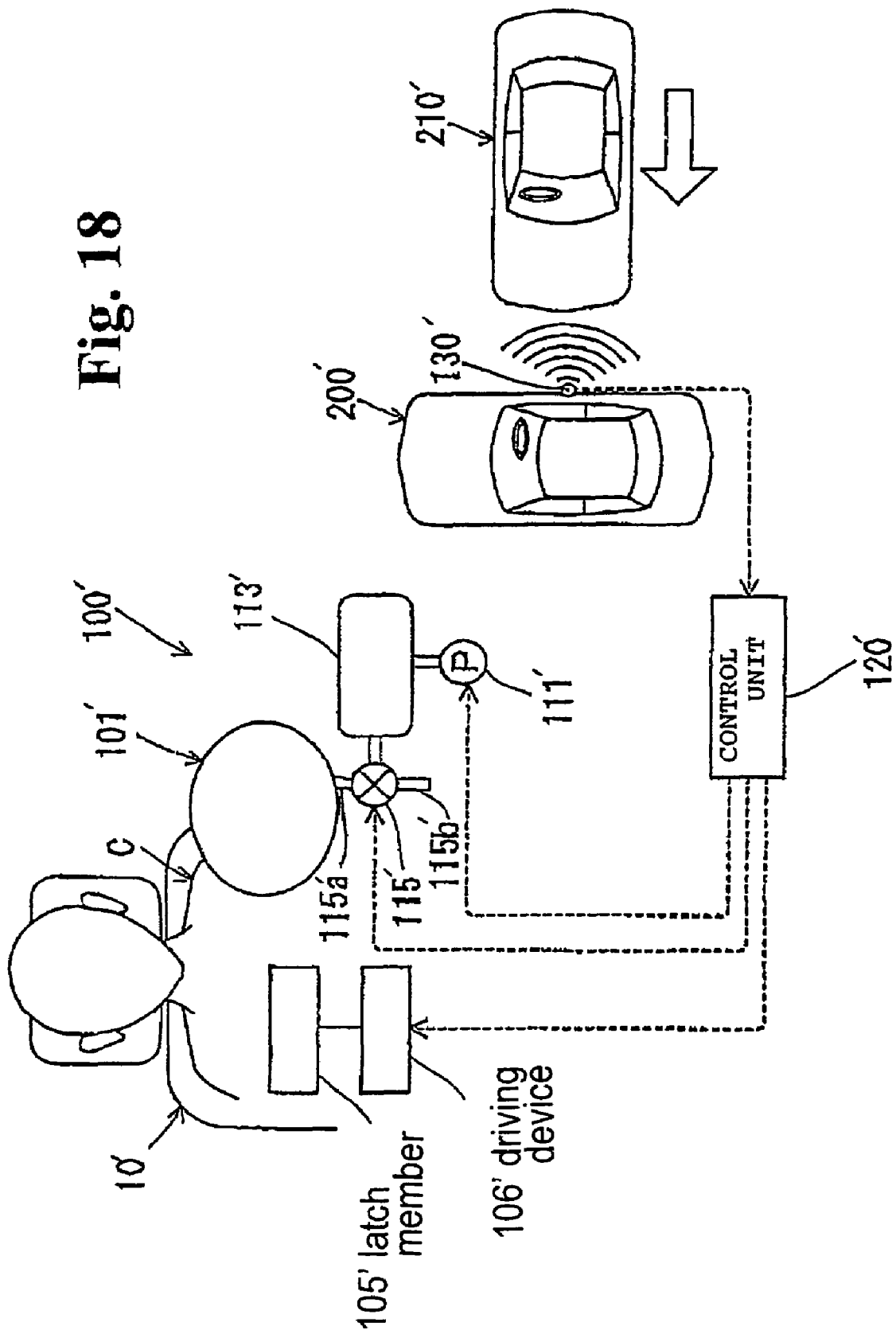
FIG. 18 is a schematic view showing a passenger protection apparatus mounted on a vehicle according to a sixth embodiment of the present invention.

As shown in FIG. 18, the passenger protection apparatus 100' is mounted on a vehicle 200' (automobile), and attached to a vehicle seat 10' where the vehicle passenger C is seated. In addition to the passage protecting apparatus 100', another passenger protection apparatuses may be mounted on a body side member such as a trim and a pillar.

As shown in FIG. 18, the vehicle 200', i.e., the vehicle with a passenger-protecting apparatus, is provided with at least a plurality of vehicle seats including a vehicle seat 10', a passenger protection apparatus 100', and a radar sensor 130'. The passenger protection apparatus 100' has a function of protecting the vehicle passenger C on the vehicle seat 10' of the vehicle 200' upon a vehicle accident such as a side collision (such as a side collision caused by another vehicle 210') or a roll-over of the vehicle 200'. The passenger protection apparatus 100' mainly comprises an airbag 101', an air pump 111', an air tank 113', a control valve 115', and a control unit (ECU) 120'. The passenger protection apparatus 100' may include the radar sensor 130' mounted on the vehicle 200'.

Upon a vehicle accident such as a side collision or a roll-over of the vehicle 200', the airbag 101' is deployed in a passenger protecting region for protecting the passenger C. In this embodiment, the airbag 101' is expandable and contractible, and is deployed and expanded in the passenger protecting region prior to a collision of the vehicle 200'. The passenger protecting region includes a region between the vehicle passenger C and a vehicle sidewall and a region in front of the vehicle passenger C. Before deployment and expansion, the airbag 101' is housed in the vehicle seat 10' in a state folded into a predetermined shape in advance. The airbag 101' corresponds to a passenger protecting device and an airbag in the present invention.

Although not specifically shown, the control unit 120' comprises a CPU (central processing unit), an input/output unit, a storage unit, and a peripheral device. In this embodiment, the control unit 120' is electrically connected to a driving device (actuator) 106', the air pump 111', a control valve 115', and the radar sensor 130' to exchange detection signals and control signals with these component members. More specifically, detection information (detection signals) detected by the radar sensor 130' is entered the control unit 120' as input signals. The control unit 120' issues a driving signal to the driving device 106', a start or stop signal to the air pump 111', and an opening adjusting signal to the control valve 115' on the basis of an input signal from the radar sensor 130'. The control unit 120' corresponds to a control device in the present invention.

The control unit 120' may have a configuration for controlling only the passenger protection apparatus 100', or vehicle component members other than the passenger protection apparatus 100' in addition to the passenger protection apparatus 100' or the vehicle as a whole simultaneously.

The radar sensor 130' is mounted on the sidewall of the vehicle 200' for detecting a vehicle (vehicle 210' in FIG. 18) on a side as an object of collision, so that a collision of an obstacle on the side is foreseen. By measuring waves reflected by the object of collision while directing electromagnetic waves having a wavelength of a few millimeters toward the object of collision (milli-wave or a laser beam), a radar known as a milli-wave radar or laser radar may be used for detecting (measuring) detection information (detection signal) such as a distance to the object of collision and a relative speed. The radar sensor 130' corresponds to a detecting device in the present invention.

Although not specifically shown, a detecting sensor is provided on the vehicle 200' for determining whether the vehicle 200' is subjected to an accident such as a collision or roll-over. Detection information (detection signal) detected by the detection sensor is entered as an input signal into the control unit 130'. A sensor known as an acceleration sensor is applicable as a detection sensor for detecting (measuring)

detection information (detection signal) including accelerations in three axial directions (X-axis, Y-axis and Z-axis) acting on the vehicle.

Figure 19:
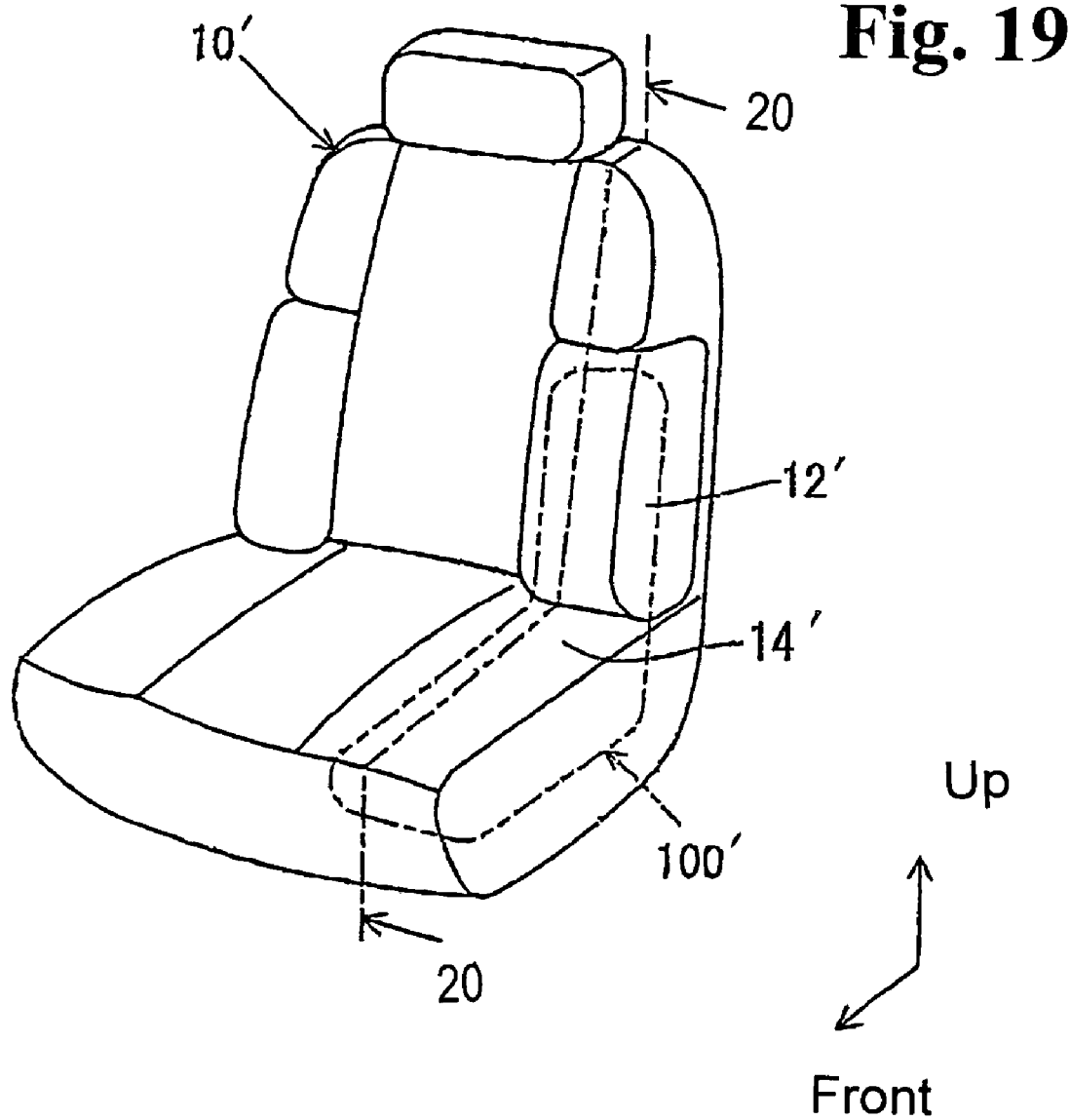
FIG. 19 is a perspective view of a vehicle seat having the passenger protection apparatus according to the sixth embodiment of the present invention.
Figure 20:
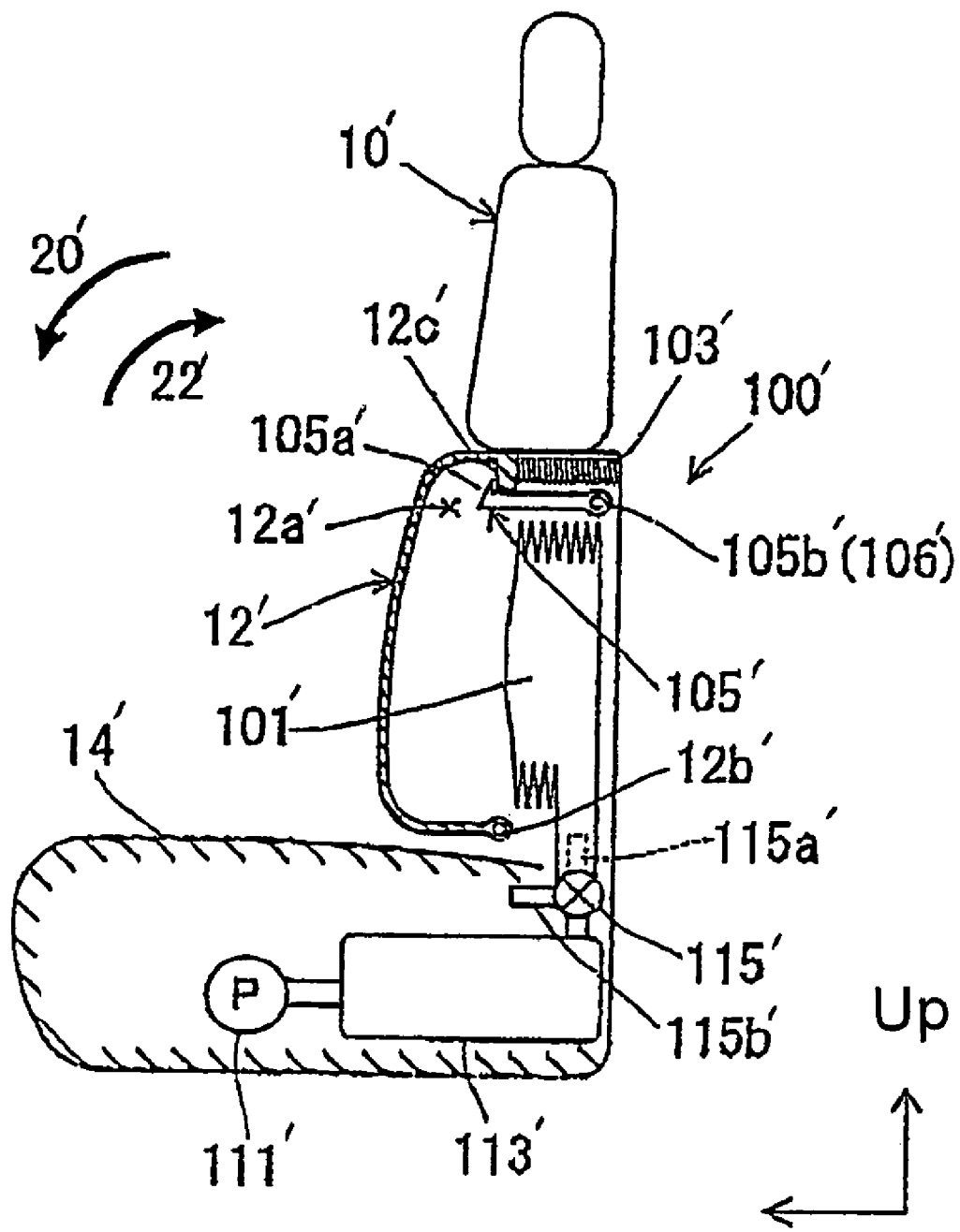
FIG. 20 is a sectional view of the vehicle seat taken along line 20-20 in FIG. 19.

The details configuration of the passenger protection apparatus 100' will be described with reference to FIGS. 19 and 20. FIG. 19 is a perspective view of the vehicle seat 10' in a state in which the passenger protection apparatus 100' is housed in a vehicle seat. FIG. 20 is a sectional structure of the vehicle seat 10' taken along line 20-20 in FIG. 19. FIGS. 19 and 20 show a state that the passenger protection apparatus 100' is incorporated into the vehicle seat 10', and is not controlled by the control unit 120'.

As shown in FIG. 19, the passenger protection apparatus 100' is housed in portions of the vehicle set 10' corresponding to a seat back side portion and a seat cushion side portion. More specifically, as shown in FIG. 20, the airbag 101', a return spring 103', and a latch member 105' are arranged on the seat back side member 12' on the vehicle rear side. The air pump 111', the air tank 113', and the control valve 115' are arranged below the seat cushion side member 14'.

The seat back side member 12' has a configuration covering the vehicle front side of the airbag 101', and comprises a concave housing portion 12a', a rotation shaft 12b', and an engagement portion 12c'. The housing portion 12a' serves as a housing space for retaining the airbag 101' in the initial state folded in advance in a predetermined shape. The rotation shaft 12b' is fixed to the vehicle seat 10' as a rotation fulcrum for allowing rotation in the arrow directions 20' and 22' in FIG. 20 of the seat back side member relative to the vehicle seat 10'. The engagement portion 112c' engages the other end of a return spring 103' having an end fixed to the vehicle seat 10', and is also a portion engaging the leading end 105a' of a latch member 105'. The latch member 105' is rotatable in the arrow directions 20' and 22' in FIG. 20 around the rotation shaft 105b' by a driving device (actuator) 106' such as an electric motor.

The seat back side member 12' having the above-mentioned configuration can rotate between a first set position shown in FIG. 20 and a second set position shown in FIG. 23 (described later) with the rotation shaft 12b' as the fulcrum, and is elastically urged to the first set position by a return spring 103' serving as an elastic spring in the present invention. The return spring 103' includes various types of elastic springs capable of imparting an elastic urging force such as a coil-shaped and sheet-shaped spring. The seat back side member 12' has a configuration in which the engagement portion 12c' thereof engages (hooks) the leading end 105a' of the latch member 105' driven by the driving device 106' for preventing rotation thereof in the arrow direction 20'. The air pump 111' is a pump having a function of compressing air (to a high pressure) and feeding compressed air into the air tank 113'. The air tank 113' is a tank having a function of temporarily storing compressed air fed from the air pump 111'.

The control valve 115' is installed in an air feeding path between the airbag 101' and the air tank 113' for feeding compressed air into the airbag 101' via the air feeding section 115a' and discharging air outside the airbag 101' via the air discharging section 115b' from the interior of the airbag 101'. The gas supplying device, the gas discharging device, and the driving device in the present invention are formed of the air feeding path, the air pump 111', the air tank 113', and the control valve 115' and the like. The control valve 115' may be formed of a separate filling valve and a discharging valve.

Figure 21:
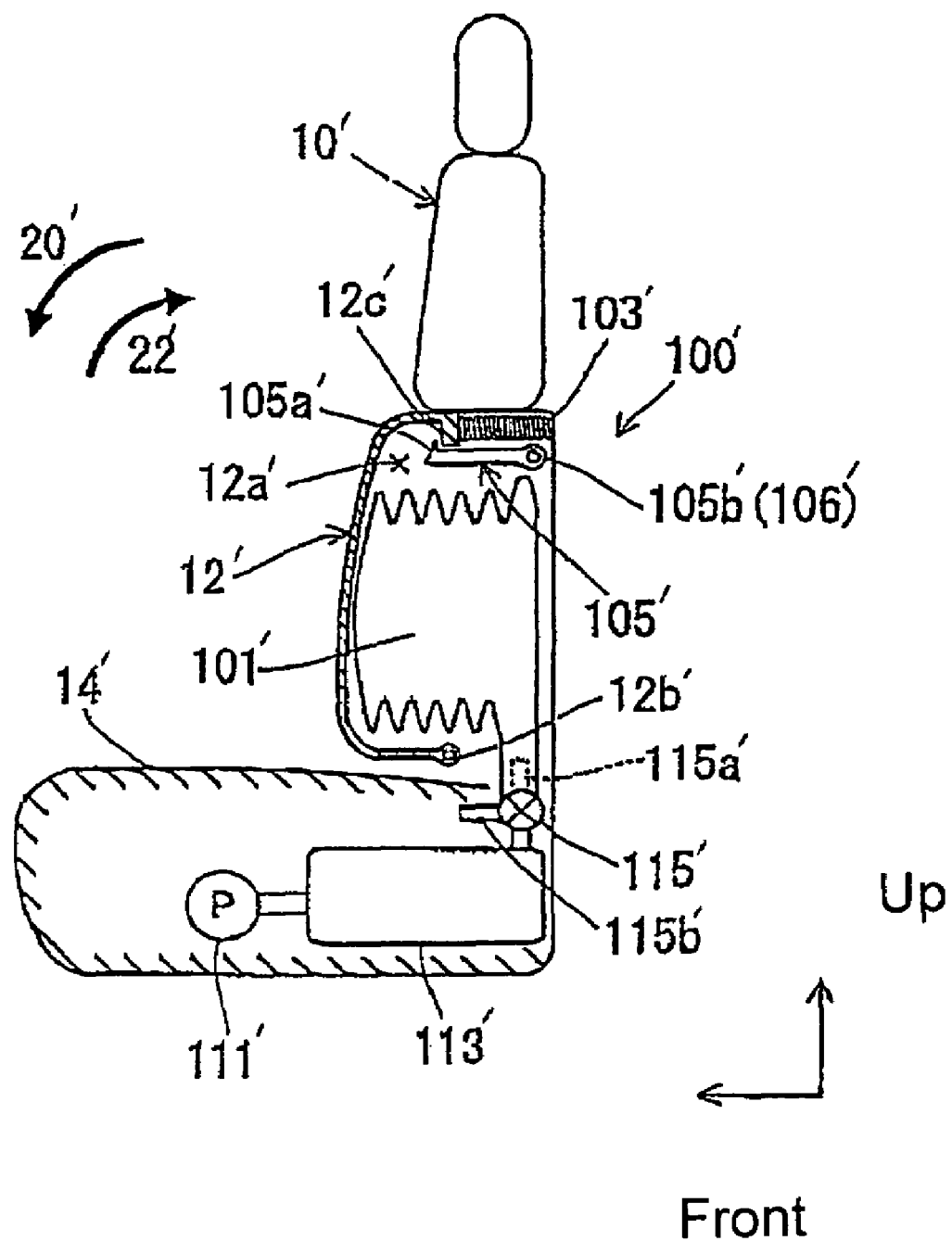
FIG. 21 is a sectional view of the passenger protection apparatus in an initial control state according to the sixth embodiment of the present invention.
Figure 22:
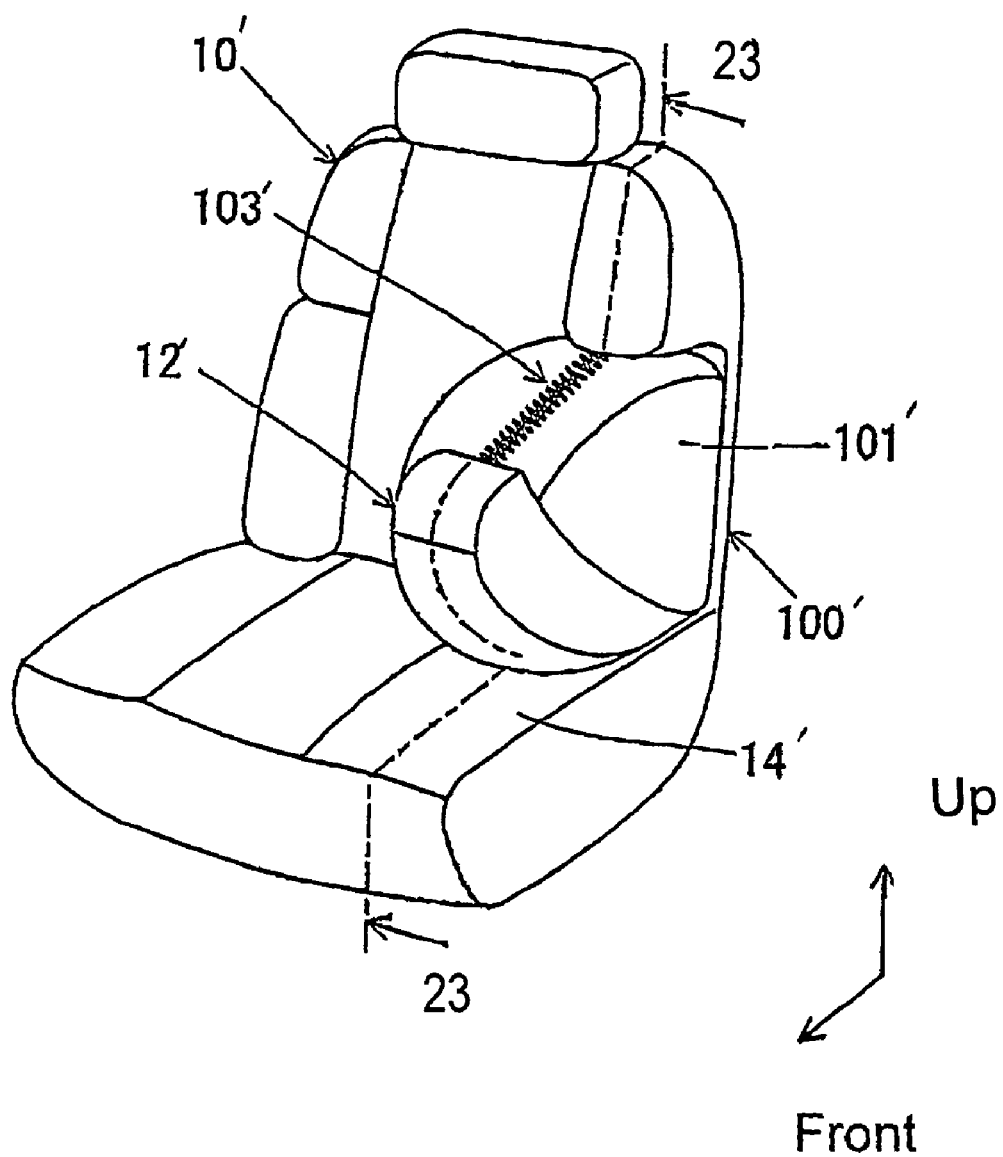
FIG. 22 is a perspective view of the vehicle seat when the passenger protection apparatus is in a collision foreseeing control state according to the sixth embodiment of the present invention.

An operation of the passenger protection apparatus 100' having the above-mentioned configuration will be described with reference to FIGS. 18 to 23. FIG. 21 is a sectional view of the passenger protection apparatus 100' in the initial control state. FIG. 22 is a perspective view of the vehicle seat 10' in a collision foreseeing control state of the passenger protection apparatus of the embodiment. FIG. 23 is a sectional structure of the vehicle seat 10' taken along line 23-23 in FIG. 22.

As shown in FIG. 18, the radar sensor 130' constantly or intermittently detects information about an object of collision (vehicle, obstacle, etc.) on the side of the vehicle 200', i.e., the vehicle 210' in the embodiment, and enters the detected information into the control unit 120'. The control unit 120' foresees a vehicle collision by determining the possibility of the vehicle 200' (own vehicle) colliding with the vehicle 210' (other vehicle). In response to the collision foreseeing information, the control unit 120' executes controls such as initial control, collision foreseeing control, collision occurrence control, and collision avoidance control (described later).

When the operation of the vehicle 200' starts, the control unit 120' activates the air pump 111'. A pressure in the air tank 113' is elevated to a first pressure in advance. When an object of collision is not detected on a side of the vehicle 200' by the radar sensor 130', i.e., when a side collision is not foreseen, the control unit 120' carries out the initial control. With the initial control, the control unit 120' adjusts the pressure in the airbag 101' to a second pressure lower than the first pressure in the air tank 113'. More specifically, the control unit 120', while issuing a signal for closing the air discharging section 115b' to the control valve 115', outputs a signal for opening the air feeding section 115a' to adjust the pressure in the airbag 101' to the second pressure, and issues a signal for closing the air feeding section 115a'. As a result, the airbag 101' expands in the housing portion 12a' of the seat back side member 12', as shown in FIG. 21, and the inner pressure thereof is kept at the second pressure.

The control unit 120' issues a control signal to the driving device 106' so as to hold a state in which the leading end 105a' of the latch member 105' engages (is caught by) the engagement portion 12c' of the seat back side member 12', as shown in FIG. 21. In the initial control state shown in FIG. 21, the seat back side member 12' is elastically urged by the return spring 103' to the first set position, and the rotation in the direction arrow 20' is prevented by the latch member 105'.

When the vehicle 210' approaching a side of the vehicle 200' is detected by the radar sensor 130', and the possibility of the vehicle 210' side-colliding with the vehicle 200' is determined to be high, a collision foreseeing control is conducted. The control unit 120' issues a signal for opening the air feeding section 115a' to close the air discharging section 115b' to the control valve 115' prior to the vehicle side collision. As a result, compressed air at the first pressure in the air tank 113' is gradually filled in the airbag 101' via the air feeding section 115a'.

Figure 23:
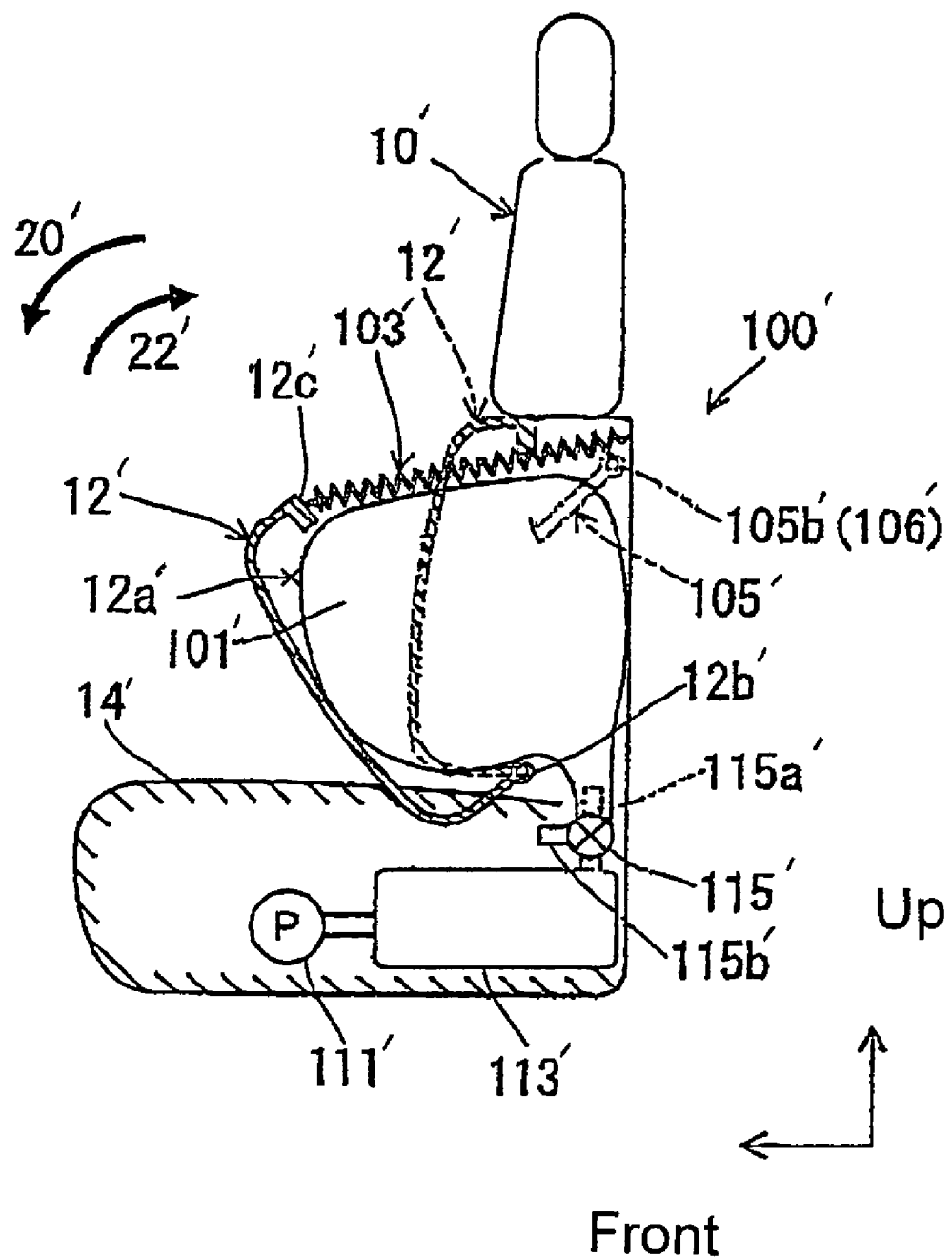
FIG. 23 is a sectional view of the vehicle seat taken along line 23-23 in FIG. 22.

As shown in FIG. 23, the control unit 120' issues a control signal to the driving device 106' SO as to cancel the engaged state (hooked state) of the leading end 105a' of the latch member 105' with the engagement portion of the seat back side member 12'. In the state of the collision foreseeing control shown in FIG. 23, the seat back side member 12' is allowed to rotate in the direction arrow 22' against the elastic urging force of the return spring 103'. At this point, the airbag 101' is deployed and expanded from the ordinary housed state shown in FIG. 21 (the ordinary initial state in which the airbag 101' is housed) to the collision-preparing state shown in FIG. 22 (the state for preparing for an actual vehicle collision upon occurrence thereof (preliminary state)). The pressing force of the airbag 101' surpasses the elastic urging force of the return spring 103'. As a result, the seat back side member 12' moves with a rotation from the first set position shown in FIG. 21 in the direction arrow 20' to the second set position shown in FIG. 23.

The airbag 101' is deployed and expanded into a collision-preparing state in the collision-preparing region. The expanded airbag 101' in the collision-preparing state in the collision-preparing region is held for passenger protection upon a possible side collision of the vehicle 210' with the vehicle 200'. The collision-preparing region shown in FIG. 23 is located between the vehicle sidewall and the side of the vehicle passenger (head, neck, shoulder, chest, abdomen, knees and lower limbs). In this embodiment, the airbag 101' has such a configuration that the collision-preparing state is closer to the vehicle passenger C than the ordinary housed state, thereby rapidly coping with passenger protection upon a vehicle accident in the collision occurrence control (described later).

The ordinary housed state of the airbag 101' shown in FIG. 21 corresponds to an ordinary housed state in the present invention, and the collision-preparing state of the airbag 101' shown in FIG. 23 corresponds to a collision-preparing state and passenger protecting state in the present invention. The state of the airbag 101' shown in FIG. 20 may be the ordinary housed state. The first set position of the seat back side member 12' corresponds to a first set position in the present invention, and the second set position of the seat back side member 12' corresponds to a second set position in the present invention.

When the vehicle 210' actually side-collides with the vehicle 200', or a vehicle collision is detected by the detecting sensor having the configuration, the inner pressure of the airbag 101' deployed and expanded in the collision-preparing region prior to the vehicle collision in the collision-preparing state with the collision foreseeing control is maintained, or the pressure is adjusted to a lower level by the control valve 115'. With the airbag 101', the impact force acting on a side (head, neck, shoulder, chest, abdomen, knees, and lower limbs) of the vehicle passenger (vehicle passenger C in FIG. 18) is alleviated, thereby ensuring passenger protection. In other words, in this embodiment, the collision-preparing region serves as a region substantially corresponding to the passenger protecting region for protecting the vehicle passenger C, and the collision-preparing state of the airbag 101' serves as the passenger protecting state as it is.

In the collision occurring control, the airbag 101' is deployed and expanded in the collision-preparing region prior to the vehicle collision in the collision-preparing state in the collision foreseeing control, and may further be deployed and expanded in the passenger protecting state (corresponding to a passenger protecting state in the present invention) in a region different from the collision-preparing region (corresponding to a passenger protection region in the present invention) so as to protect the vehicle passenger C in the region. In this case, the collision-preparing region is a region different from the passenger protecting region for protecting the vehicle passenger C. Such a region may be located between the vehicle sidewall and the side or the front of the vehicle passenger C (head, neck, shoulder, chest, abdomen, knees and lower limbs) for absorbing the impact force acting on the side or the front of the vehicle passenger C, thereby ensuring passenger protection. In other words, in this embodiment, the collision-preparing region is a region different from the passenger protecting region when the vehicle passenger C is protected, and the collision-preparing state of the airbag 101' is configured as a state different from the passenger protecting state.

In this configuration, a series of operations of the airbag 101' from the ordinary housed state to the passenger protecting state through the collision preparing state can be carried out more smoothly by setting the collision preparing state, so that the airbag 101' on standby prior to the vehicle collision does not disturb the vehicle passenger. In this configuration, it suffices that the airbag 101' reversibly moves at least between the ordinary housed state and the collision preparing state or may be returnable from the passenger protecting state to the collision preparing state. Alternatively, after the vehicle accident, the airbag 101' may be an irreversible configuration and does not return from the passenger protecting state to the collision preparing state.

When it is determined that the possibility of a collision of the vehicle 210' with the vehicle 200' is low and the side collision is actually avoided, and the object of collision is no longer detected on a side of the vehicle 200' by the radar sensor 130', the control unit 120' performs control so as to contract the airbag 101' as the ordinary housed state (the state shown in FIG. 20 or FIG. 21)

In other words, the control unit 120' adjusts the pressure in the airbag 101' to a lower level through the collision avoidance control. More specifically, a signal for opening the air discharge section 115b' is issued to the control valve 115'. Accordingly, the airbag 101' is pressed with the elastic urging force of the return spring 103', and the seat back side member 12' rotates from the second set position shown in FIG. 23 to the first set position shown in FIG. 21 in the arrow direction 22', so that the airbag 101'1 contracts to the ordinary housed state. In this embodiment, the airbag 101' is reversibly operable between the ordinary housed state shown in FIG. 20 or 21 and the collision-preparing state shown in FIG. 23. Then, the control unit 120' activates the air pump 111' as in the initial control described above to set the pressure in the air tank 113' to the level of the first pressure elevated in advance and adjust the pressure in the airbag 101' to the second pressure lower than the first pressure in the air tank 113', thereby preparing for the next collision foreseeing control.

According to the passenger protection apparatus 100' of this embodiment, as described above, it is possible to achieve a configuration using the airbag 101' for ensuring rapid passenger protection upon a vehicle accident. More specifically, in this embodiment, when a vehicle collision is foreseen, the airbag 101' can be expanded in advance from the ordinary housed state to the collision-preparing state to prepare for a subsequent accident. This permits rapid execution of passenger protection upon a vehicle accident as it is by using an airbag 101' expanded in advance before the vehicle collision so as to achieve the collision-preparing state. In this embodiment, by adapting a configuration in which the passenger protecting device 100' is attached to the vehicle seat arranged in the proximity of, or in close contact with, the vehicle passenger, it is possible to more rapidly cope with passenger protection upon a vehicle accident. In this embodiment, when the vehicle collision does not actually occur, it is possible to return the airbag 101' from the collision-preparing state to the ordinary housed state to prepare for the next collision.

By using the passenger protection apparatus 100' of this embodiment as described above, the airbag 101' in the collision-preparing state in advance before the vehicle collision can be deployed and expanded rapidly to protect a passenger upon a vehicle accident. The seat back side member 12' forming a part of the vehicle seat is used also as an airbag cover covering the airbag 101'. The seat back side member 12' as the airbag cover is operated with the expansion force of the airbag 101' and the elastic urging force of the return spring 103'. The vehicle 200' is provided with the passenger protection apparatus 100' for protecting a passenger upon a vehicle accident.

The present invention is not limited to the above-mentioned embodiments, and various modifications are conceivable. For example, the following embodiments applying the above-mentioned embodiments are applicable.

In the above-mentioned embodiments, the passenger protection apparatus 100' uses the airbag 101' for protecting a passenger. The present invention is applicable to a configuration of a passenger protection apparatus for achieving passenger protection by using a device other than the airbag such as a protecting pad. The protecting pad may include a pad member formed of a foam material. The driving device for driving the protecting pad includes a link mechanism or an expandable object such as an airbag having a known configuration. The seat back side member 12' as the airbag cover is operated with the expansion force of the airbag 101' and the elastic urging force of the return spring 103'. In the present invention, the seat back side member 12' may be operated with a special actuator (driving device).

In the above-mentioned embodiments, the passenger protection apparatus 100' is housed over the portions corresponding to the seat back side portion and the seat cushion side portion of the vehicle seat 10'. In the present invention, it is sufficient that the passenger protecting device such as the airbag is operated reversibly between the ordinary housed state and the collision-preparing state. It is possible to mount the passenger protection apparatus at various portions of the vehicle seat.

In the above-mentioned embodiments, the airbag 101' in the state shown in FIG. 21 (inner pressure is held at a second pressure) is deployed and expanded in the state shown in FIG. 23 in the collision foreseeing control. In the present invention, the airbag 101' in the state shown in FIG. 20 may be deployed and expanded in the state shown in FIG. 23 through the state shown in FIG. 21 or as it is.

The present invention is applicable to the passenger protection apparatus for protecting a passenger by preventing a so-called submarine phenomenon, in which the vehicle passenger on the vehicle seat tends to move through the seat belt forward of the vehicle seat or diagonally downward of the vehicle seat upon a vehicle accident. For example, an expansion member such as an airbag is incorporated in the front portion of the seat cushion of the vehicle seat. When a vehicle collision is foreseen, the expansion member is expanded and the seat cushion front portion lifts the seat upwardly in advance, thereby lifting legs of the vehicle passenger, thereby preventing the submarine phenomenon in a collision accident. A protecting pad (protecting board) may be provided in the front portion of the seat cushion of the vehicle seat. When a vehicle collision is foreseen, the protecting pad (protecting board) moves upwardly over the seat in advance for lifting legs of the passenger, thereby preventing the submarine phenomenon in a collision accident. In this configuration, it is sufficient that the expanding member or the protecting pad (protecting board) is operable reversibly between the ordinary housed state and the collision-preparing state.

The disclosures of Japanese Patent Applications No. 2004-018298, filed on Jan. 27, 2004, and No. 2004-373908, filed on Dec. 24, 2004, are incorporated in the application.

While the invention has been explained with reference to the specific embodiments of the invention, the explanation is illustrative and the invention is limited only by the appended claims.

What is claimed is:

1. A passenger protection apparatus mounted on a vehicle, comprising:
    a detecting device for foreseeing and detecting a collision of the vehicle,
    a passenger protection device to be situated between a passenger and the vehicle for protecting the passenger upon the collision, said passenger protection device comprising an expandable/contractible airbag,
    a driving device attached to the passenger protection device for driving the passenger protection device reversibly in a direction approaching the passenger and a direction away from the passenger, and
    a control device for controlling the driving device according to information of the detecting device, said control device controlling the driving device to partially expand the airbag prior to the collision from a first position to a second position toward the passenger when the detecting device foresees the collision, and to contract the airbag from the second position to the first position when the collision is avoided,
    wherein said driving device includes a gas supply device capable of feeding gas to the airbag, a gas discharge device capable of discharging the gas in the airbag, and an urging device for urging the airbag toward the first position.

2. A passenger protection apparatus according to claim 1, wherein said control device controls the gas supply device and the gas discharge device to expand the air bag to the second position against an urging force of the urging device when the detecting device foresees the collision, and controls the gas supply device and the gas discharge device to contract the air bag to the first position with the urging force of the urging device when the collision is avoided.

3. A passenger protection apparatus according to claim 1, wherein said passenger protection device further includes an elastic protecting pad member attached to the airbag, and said urging device is attached to the protecting pad member to urge the airbag and the protecting pad member toward the first position, said control device controlling the gas supply device and the gas discharge device to arrange the pad member to the second position against an urging force of the urging device when the detecting device forecasts the collision, and controlling the gas supply device and the gas discharge device to contract the airbag and arrange the pad member to the first position according to the urging force of the urging device when the collision is avoided.

4. A passenger protection apparatus according to claim 1, wherein said control device controls the driving device to move the passenger protection device to the second position in a passenger protection region for protecting the passenger upon the collision.

5. A passenger protection apparatus according to claim 1, wherein said control device controls the driving device to move the passenger protection device to a third position in a passenger protection region from the second position away from the passenger protection region for protecting the passenger upon the collision.

6. A passenger protection apparatus according to claim 1, wherein said passenger protection device is mounted on a sidewall portion of the vehicle.

7. A passenger protection apparatus, comprising:
- a passenger protecting device attached to a seat in a vehicle for protecting a passenger in the seat upon a vehicle collision, and including an expandable/contractible airbag,
- a driving device attached to the passenger protecting device for reversibly driving the passenger protecting device between an ordinary housed state and a collision-preparing state, said driving device including a gas supplying device for feeding gas to the airbag and a gas discharging device for discharging the gas in the airbag, and
- a control device connected to the driving device for controlling the driving device to partially expand the airbag from the ordinary housed state as the collision-preparing state prior to the vehicle collision when the vehicle collision is foreseen, said control device controlling the driving device to return the airbag from the collision-preparing state to the ordinary housed state when the vehicle collision is avoided.

8. A passenger protection apparatus according to claim 7, wherein said control device controls the gas supplying device and the gas discharging device to expand the airbag in the collision-preparing state when the vehicle collision is foreseen, and controls the gas supplying device and the gas discharging device to contract the airbag in the ordinary housed state when the vehicle collision is avoided.

9. A passenger protection apparatus according to claim 8, further comprising an airbag cover covering the airbag and constituting a part of the seat, said airbag cover operating between a first position where the airbag cover covers the airbag in the ordinary housed state and a second position where the airbag cover allows the airbag to expand in the collision-preparing state.

10. A passenger protection apparatus according to claim 9, further comprising an elastic spring for urging the airbag cover to the first position, said airbag pressing the airbag cover from the first position to the second position against an urging force of the elastic spring when the airbag is expanded in the collision-preparing state, and being pressed by the airbag cover to be contracted in the ordinary housed state when the airbag cover moves to the first position with the urging force of the elastic spring.

11. A passenger protection apparatus according to claim 7, wherein said airbag in the collision-preparing state is situated in a region substantially corresponding to a passenger protecting region for protecting the passenger, said control device controlling the driving device to move the airbag in the collision-preparing state before the vehicle collision and to hold the airbag in the collision-preparing state upon the vehicle collision to thereby protect the passenger through the airbag.

12. A passenger protection apparatus according to claim 7, wherein said airbag in the collision-preparing state is situated in a region different from a passenger protecting region for protecting the passenger, said control device controlling the driving device to move the airbag to the collision-preparing state before the vehicle collision and to move the airbag to the passenger protecting region upon the vehicle collision to thereby protect the passenger through the airbag.

13. A vehicle comprising the passenger protection apparatus according to claim 1.

14. A vehicle according to claim 13, further comprising a detecting device for detecting information associated with the vehicle collision, said control device controlling the driving device to move the airbag from the ordinary housed state to the collision-preparing state prior to the vehicle collision when the detecting device foresees the vehicle collision, and controlling the driving device to return the airbag from the collision-preparing state to the ordinary housed state when the vehicle collision is avoided.

* * * * *